United States Patent [19]
Kato et al.

[11] Patent Number: 5,499,166
[45] Date of Patent: Mar. 12, 1996

[54] LIGHTING DEVICE FOR VEHICLE

[75] Inventors: Hideyuki Kato, Nishio; Yuji Chigusa, Kariya, both of Japan

[73] Assignee: Nippondenso Co., Ltd., Kariya, Japan

[21] Appl. No.: 78,088

[22] Filed: Jun. 18, 1993

[30] Foreign Application Priority Data

Jun. 19, 1992 [JP] Japan ................................ 4-159922
Dec. 24, 1992 [JP] Japan ................................ 4-344404

[51] Int. Cl.$^6$ ........................... F21V 8/00; B60Q 1/04
[52] U.S. Cl. ................. 362/32; 362/61; 385/33; 385/901
[58] Field of Search ................ 362/32, 61, 319, 362/320, 351; 385/31, 33, 901

[56] References Cited

U.S. PATENT DOCUMENTS

| | | | |
|---|---|---|---|
| 3,649,098 | 3/1972 | Suverison | 385/33 |
| 4,530,578 | 7/1985 | Kato | 362/32 |
| 4,811,172 | 3/1989 | Davenport et al. . | |
| 4,868,718 | 9/1989 | Davenport et al. . | |
| 4,949,227 | 8/1990 | Finch et al. . | |
| 4,958,263 | 9/1990 | Davenport et al. . | |
| 5,257,168 | 10/1993 | Davenport et al. | 362/61 |

FOREIGN PATENT DOCUMENTS

| | | | |
|---|---|---|---|
| 0135652 | 11/1978 | Japan | 385/33 |
| 1243301 | 9/1989 | Japan . | |
| 2172102 | 7/1990 | Japan . | |
| 34401 | 1/1991 | Japan . | |
| 3187104 | 8/1991 | Japan . | |

*Primary Examiner*—Ira S. Lazarus
*Assistant Examiner*—Y. Quach
*Attorney, Agent, or Firm*—Cushman, Darby & Cushman

[57] ABSTRACT

A lighting device for use in a vehicle which has a lighting unit for receiving light from a light source and emitting the received light. The lighting unit is provided with an optical fiber for receiving light from the light source and emitting the received light and an optical waveguide directly connected to the optical fiber for directly receiving the light emitted from the optical fiber and emitting light which has a desired luminous intensity distribution. Thereby, the lighting unit can have a simple structure and can be provided at low cost.

13 Claims, 17 Drawing Sheets

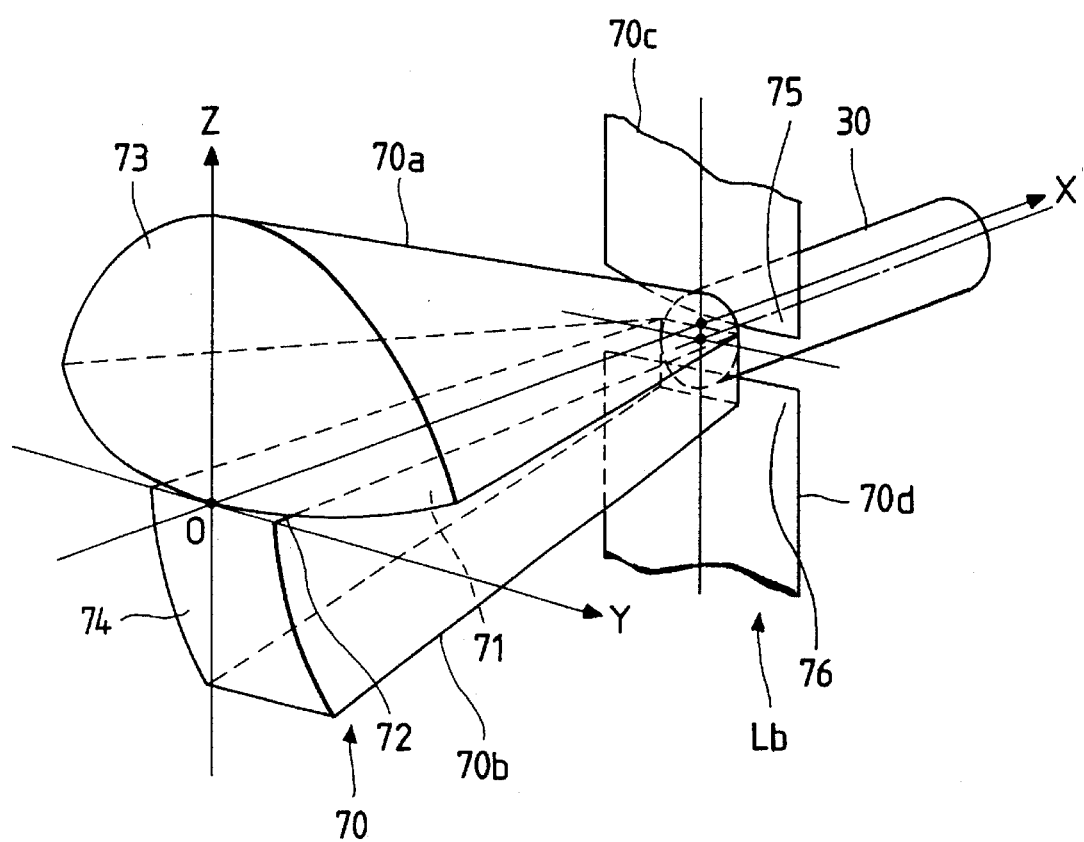

LIGHTING DEVICE FOR VEHICLE

BACKGROUND OF THE INVENTION

1. Field of the Invention

This invention relates to a lighting device suitable for a vehicle which has various lighting devices (namely, light fittings) such as a head lights or lamps.

2. Description of the Related Art

A conventional lighting device of this type is disclosed in, for example, the U.S. Pat. No. 4,958,263 (corresponding to the Japanese Unexamined Patent Publication (Kokai Tokkyo Koho) Official Gazette No. H2-172102). In this conventional lighting device, light emitted from a light source is incident on an end of a bundle of optical fibers. This incident light is guided through the bundle of optical fibers. Then, light outputted from the other end of the bundle of optical fibers is emitted forward of a vehicle through an optical transmission device.

In this conventional lighting device, however, the optical transmission device has a complex structure and as a consequence this lighting device cannot have a compact structure. A compact structure cannot be achieved since the transverse section of the end of the bundle of optical fibers of the device has a rectangular shape the vertical side of which is shorter than the horizontal side, such that the (transverse) luminous intensity distribution curve of light emitted from the device is shaped like a rectangle, the vertical side of which is shorter than the horizontal side thereof (namely, the vertical side is relatively short and the horizontal side is relatively long). Further, even if the traverse section of the end of the bundle of optical fibers is shaped like a circle and the light outputted from the bundle of optical fibers is made to be transmitted through two aspherical cylindrical lenses, the axes of which intersect orthogonally, in such a manner that the (transverse) luminous intensity distribution curve of the emitted light is shaped like an ellipse which has a minor axis in the vertical direction and a major axis in the horizontal direction, the conventional lighting device cannot sufficiently carry out an essential function of illumination. Namely, the head lamp cannot illuminate forward of the vehicle to a distant place. Further, in the conventional lighting system, there is air in an optical path thereof along the direction in which the light propagates. Therefore, the conventional lighting device has another drawback in that the utilization factor of the emitted light used for direct illumination to the emitted light which is not used for direct illumination, is low. The present invention is created to eliminate the above described drawbacks of the conventional lighting device.

It is, accordingly, an object of the present invention to provide a lighting device for use in a vehicle, which device has a simple construction and is compact and can perform the essential function thereof and have a high utilization factor.

SUMMARY OF THE INVENTION

To achieve the foregoing object and in accordance with the present invention, there is provided a lighting device for use in a vehicle, which has a lighting unit for receiving light from a light source and emitting the light received. This lighting unit comprises an optical fiber for receiving light from the light source and emitting the light received and an optical waveguide directly connected to the optical fiber for directly receiving the light emitted from the optical fiber and emitting light having a desired luminous intensity distribution.

With the above described configuration, when the optical fiber emits light received from the light source, the emitted light is incident on the optical waveguide. The optical waveguide is constructed as above described, so that the emitted light has a desired luminous intensity distribution. In such a case, the optical waveguide is directly coupled to the optical fiber. Thus the light emitted from the optical fiber can be efficiently incident on the optical waveguide without loss. Further, the light fitting comprises only the optical waveguide and the optical fiber directly coupled to the optical waveguide as above described. Consequently, the lighting unit has a simple configuration and can be provided at low cost.

Moreover, in case of the lighting device of the present invention, a head lamp for emitting light received from a light source in a forward direction may be employed as the lighting device. Furthermore, a plurality of optical waveguides may be directly coupled to the optical fiber in such a manner that light emitted from the optical fiber is directly incident thereon. Additionally, the plurality of optical waveguides may be joined together in such a fashion that when the plurality of optical waveguides emit the light directly received from the optical fiber, a part of the emitted light may form what is called a "hot zone". Incidentally, in the instant application, the luminous intensity distribution of the emitted light forming what is called a "hot zone" as a "hot zone" luminous intensity distribution. Further, the luminous intensity distribution curve of another part of the emitted light may be shaped like a rectangle. In this case, when the optical fiber emits light received from the light source, the emitted light is incident on the plurality of the optical waveguides joined together in the manner as described above. Thus, light emitted from each of a part of the optical waveguides forward of the vehicle forms a "hot zone" and the luminous intensity distribution curve of light emitted from each of another part of the optical waveguides is shaped like a rectangle. In such a case, each of the optical waveguides is directly coupled or connected to the optical fiber. As a consequence, the light emitted from the optical fiber can be efficiently incident on the inside of each of the optical waveguides without loss. Additionally, as above stated, the head lamp or light consists of only the optical waveguides joined together and the optical fiber directly coupled to the optical waveguides. Consequently, the head lamp can have a simple structure and can be provided at low cost.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 7 is an enlarged perspective view of a primary part of a further lighting device, namely, a left-side head lamp (hereunder sometimes referred to as a third embodiment) of the present invention;

DETAILED DESCRIPTION OF THE PREFERRED EMBODIMENTS

Hereinafter, the preferred embodiments of the present invention will be described in detail by referring to the accompanying drawings.

Figure 1:
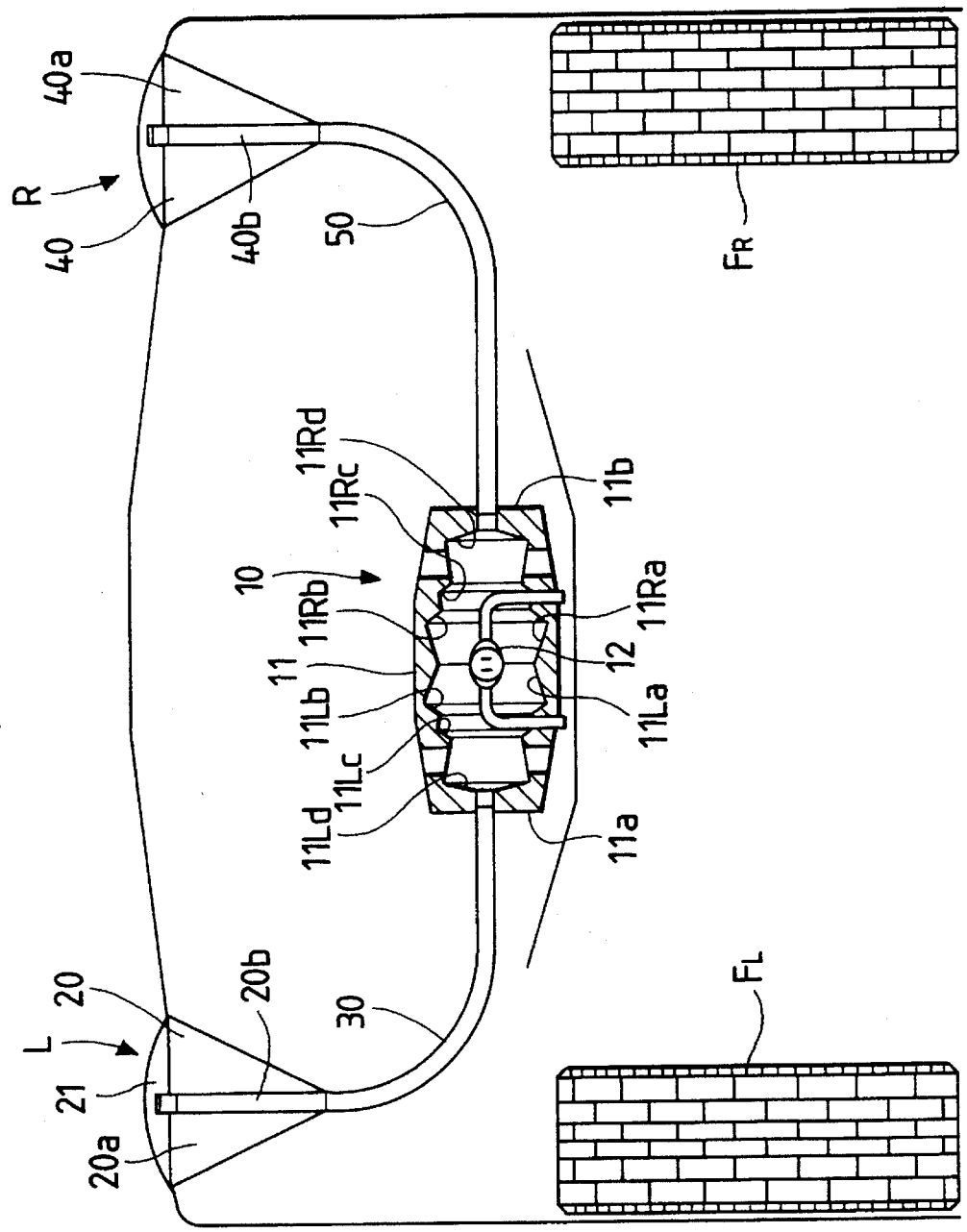
FIG. 1 is a partially cutaway view of a lighting device .(hereunder sometimes referred to as a first embodiment) for use in a vehicle, embodying the present invention.

First, the first embodiment of the present invention will be described hereinbelow by referring to the drawings. Referring to FIG. 1, there is shown the configuration of a lighting device for use in a vehicle (namely, the first embodiment of the present invention). As illustrated in this figure, this lighting device consists of a light source 10 provided at the central position in the transverse direction of a front part of the vehicle, a left-side head lamp L and a right-side head lamp R, which lamps are provided at positions symmetrical with respect to the light source 10 in the transverse direction of the vehicle. The light source 10 has a nearly cylindrical casing 11. Further, a discharge tube 12 used as a linear light source is provided at the central position in the direction along the axle within the casing 11. Moreover, on the inner wall of the casing 11, each of left-side ellipsoidal mirrors 11La to 11Ld and a corresponding one of right-side ellipsoidal mirrors lira to 11Rd are mounted at positions symmetrical with respect to the discharge tube 12 in the transverse direction. Furthermore, light generated by a discharge of the discharge tube 12 is reflected by the right-side ellipsoidal mirror 11Ra and each of the left-side ellipsoidal mirrors 11Lb to 11Ld and the reflected light is converged on the center of a right side wall 11b of the casing 11. On the other hand, light emitted from the discharge tube 12 is reflected by the left-side ellipsoidal mirror 11La and each of the right-side ellipsoidal mirrors 11Rb to 11Rd and the light reflected by these mirrors is converged on the center of a left-side wall 11a of the casing 11. Incidentally, in this figure, reference characters FL and FR denote a left-side front tire and a right-side front tire, respectively.

Figure 2:
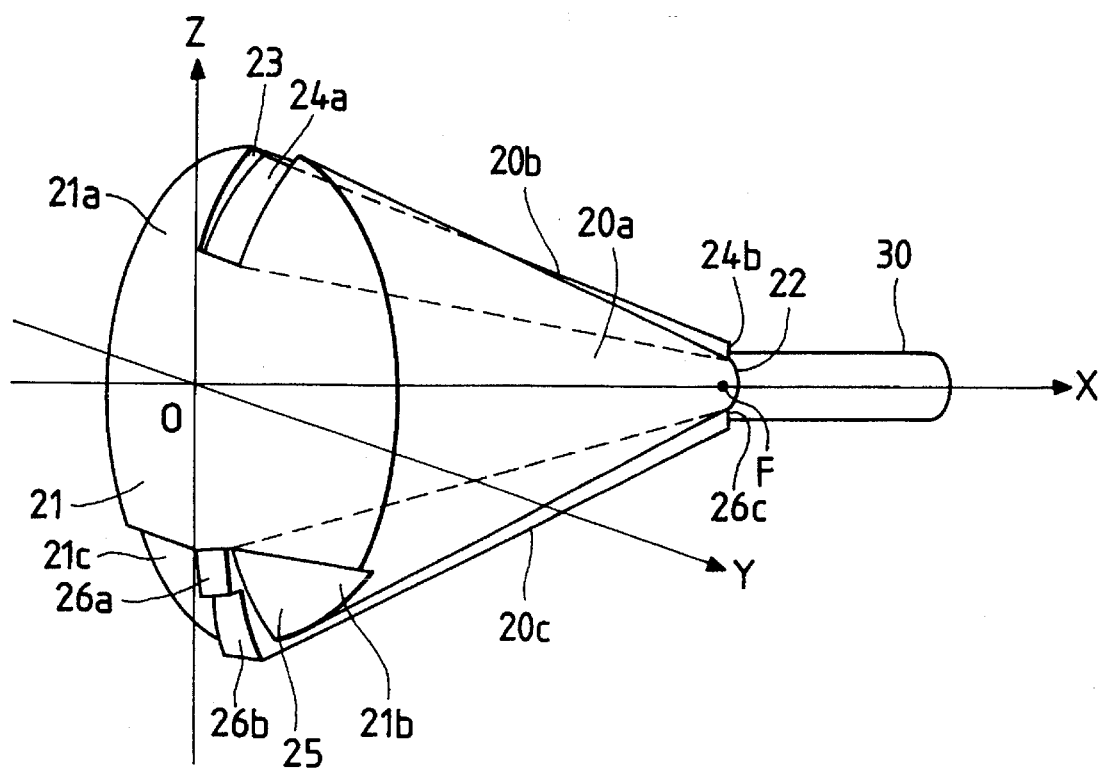
FIG. 2 is an enlarged perspective diagram illustrating a lighting unit and an optical fiber of the lighting device (namely, a head lamp) of FIG. 1.

The left-side head lamp is comprised of a lighting unit 20 provided at a left-side front part of the vehicle and an optical fiber 30 for connecting this lighting unit 20 and the light source 10. On the other hand, the right-side head lamp is comprised of a lighting unit 40 provided at a right-side front part of the vehicle and an optical fiber 50 for connecting this lighting unit 40 and the light source 10. As illustrated in FIGS. 1 and 2, the lighting unit 20 has a body 20a thereof (hereunder referred to sometimes referred to as a lighting unit body) and a pair of light guiding members 20b and 20c. The light unit body 20a is made of materials (for instance, polycarbonate, acrylic resin), which have high heat resistance and light permeability or transmittance, and is formed like a nearly circular cone. A light emitting surface 21 of this lighting unit body 20a forms a lens surface having a predetermined curvature. Further, a pole 0 of the light emitting surface 21 is matched with an origin of a three-dimensional coordinate system XYZ. The optical axis of the light emitting surface 21 is matched with X-axis.

Moreover, an object focal point F of the light emitting surface 21 is positioned in the neighborhood of a small-diameter incidence surface of the lighting unit body 20a. The light emitting surface 21 has first, second and third emitting surface portions 21a to 21c. The first emitting surface portion 21a is a region including the pole 0 of the light emitting surface 21 and serves to illuminate forward of the vehicle up to a distant place. Further, as shown in FIG. 2, the second and third emitting surface portions 21b and 21c are formed at right-side and left-side positions symmetrical with respect to Z-axis as the surfaces of a terraced lower portion of the light emitting surface 21. Further, the second and third emitting surface portions 21b and 21c serve to illuminate an oncoming car. Furthermore, the second and third emitting surface portions 21b and 21c form a lens surface, the focal point of which is in the vicinity of the focal point F of the light emitting surface 21, in the direction along Z-axis. Additionally, the second and third emitting surface portions 21b and 21c form a surface changing almost linearly in the direction along Y-direction. On the other hand, the incidence surface 22 of the lighting unit body 20a is formed generally as a circle in a plane parallel to Y-Z coordinate plane. Namely, the top and bottom portions of the incidence surface 22 are cut in such a manner to form nearly circular arcs.

Both of the light guiding members 20b and 20c are made of materials (for example, fluororesin) having high heat resistance and light permeability and are formed like a same sector as illustrated in FIG. 2. The light guiding member 20b is fixed in an upper groove 23 which is formed along the top portion of the side surface of the lighting unit body 20a in the direction of the top generatix thereof as viewed in this figure and has a nearly sectorial longitudinal section and a rectangular transverse section. In such a case, a light emitting surface 24a of the light guiding member 20b forms a lens surface, the focal point of which is in the vicinity of the focal point F, in the direction along Z-axis and also forms a surface linearly changing in the direction along Y-axis. As the result, the light emitting surface 24a of the light guiding member 20b serves to illuminate leftwardly forward or rightwardly forward of the vehicle when the vehicle turns to the left or to the right.

Figure 3A:
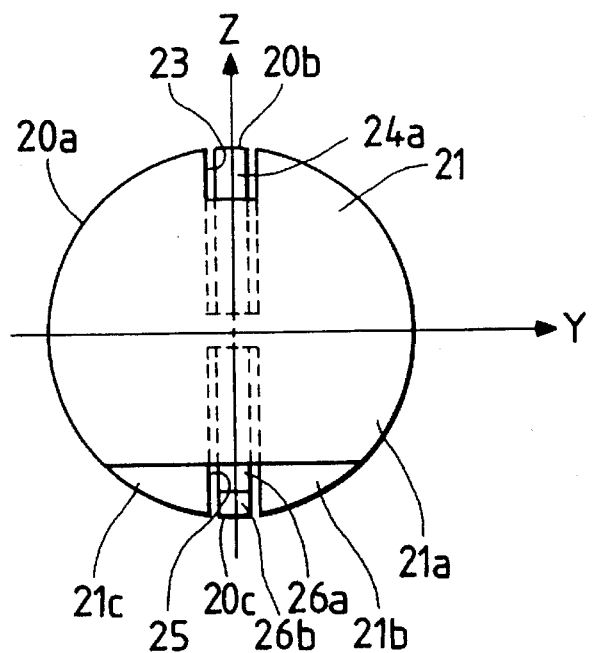
FIG. 3(A) is an elevational view of the lighting unit of FIG. 2.

Further, as shown in FIG. 3(A), the light guiding member 20b has a bottom surface fixed to the bottom surface of the top groove 23. Moreover, a gap having a predetermined width is formed between the left side surface of this light guiding member 20b and that of the top groove 23. Similarly, a gap having a predetermined width is also formed between the right side surface of this light guiding member 20b and that of the top groove 23. Furthermore, the incidence surface 24b of the light guiding member 20b, which surface is rectangular, and the incidence surface 22 of the light unit body 20a are on the same plane. As shown in FIG. 2, the rear edge portion of this light guiding member 20b protrudes from the top groove 23 tilting from the top portion of the light emitting surface 21 of the lighting unit body 20a to the top portion of the incidence surface 22 thereof.

The light guiding member 20c is fixed in a lower groove 25 which is formed along the bottom portion of the side surface of the lighting unit body 20a in the direction of the bottom generatix thereof as viewed in FIG. 2 and has a nearly sectorial longitudinal section and a rectangular transverse section. The light guiding member 20c has a pair of terraced light emitting surface portions 26a and 26b as illustrated in this figure. These emitting surface portions 26a and 26b form a lens surface, the focal point of which is in the vicinity of the focal point F, in the direction along Z-axis and also forms a surface almost linearly changing in the direction along Y-axis. Thereby, the surfaces of the light emitting surface portions 26a and 26b of the light guiding member 20c serve to illuminate downwardly forward of and in the neighborhood of the vehicle.

Further, the light guiding member 20c has a bottom surface fixed to the bottom surface of the bottom groove 25. Moreover, a gap having a predetermined width is formed between the left side surface of this light guiding member 20c and that of the bottom groove 25. Similarly, a gap having a predetermined width is also formed between the right side surface of this light guiding member 20c and that of the bottom groove 25. Furthermore, the incidence surface 26c of the light guiding member 20c, which surface is rectangular, and the incidence surface 22 of the light unit body 20a are on the same plane. As shown in FIG. 2, the rear edge portion of this light guiding member 20c protrudes from the bottom groove 25 leaning from the bottom portion of the light emitting surface 21 of the lighting unit body 20a to the bottom portion of the incidence surface 22 thereof.

The optical fiber 30 consists of a rod-like core made of the same materials as of the lighting unit body 20a and a cladding which covers the core. The refractive index of the composing material of the cladding is set as smaller than that of the core in such a manner that a total reflection of light is caused in the core. Further, the diameter of the core of the optical fiber 30 ranges from 8 to 10 millimeters (mm) or so. The upper and lower circumference portions of the emitting end surface of the core of the optical fiber 30, which portions correspond to one-fourth of the diameter of the emitting end surface, are airtightly fixed to the incidence surface 24b of the light guiding member 20b and the incidence surface 26c of the light guiding member 20c, respectively, by transparent adhesive. Further, the remaining part of the emitting surface of the core is connected to (namely, incorporates with) the incidence surface 22 of the lighting unit body 20a. Incidentally, as illustrated in FIG. 1, the optical fiber is bent and shaped like a character L and is fitted into the central portion of the left side wall 11a of the light source 10. Further, an angle of incidence of light, which is emitted by the light source 10, from the incident end surface of the core of the optical fiber 30 ranges from 5 to 30 degrees.

Meanwhile, the head lamp L is fabricated as follows. Namely, first, a metallic mold required for molding the lighting unit body 20a and the core of the optical fiber 30 from a resin integral with each other is prepared. Then, a liquid acrylic resin used as the material of the lighting unit body 20a as above described is poured into the metallic mold. Thus the lighting unit body 20a and the core of the optical fiber 30 are molded integrally. Thereafter, the light guiding members 20b and 20c are fixed in the top groove 23 and the bottom groove 25, respectively, as above stated. Upon completion of the molding and fixing steps, the lighting unit body 20a, the core of the optical fiber 80 and the light guiding members 20b and 20c are immersed in a liquid material of the cladding. Thereafter, the lighting unit body 20a, the core of the optical fiber 30 and the light guiding members 20b and 20c are pulled out of the liquid material of the cladding and is dried up. Thereby, the cladding is formed as a layer for covering the core. Further, the gap formed between the light guiding member 20b and the groove 23 and the gap formed between the light guiding member 20c and the groove 25 are filled with the material of the cladding. As the result, dusts or the like can be prevented from entering the grooves 23 and 25. Incidentally, all of the core of the optical fiber 30, the lighting unit body 20a and the light guiding members 20b and 20c may be molded as incorporating with one another.

The head lamp R is provided with a lighting unit body 40a and a pair of light guiding members 40b and 40c which correspond to the lighting unit body 20a and the pair of the light guiding members 20b and 20c, respectively (incidentally, only the light guiding member 40b is shown in FIG. 1). The lighting unit body 40a and the pair of the light guiding members 40b and 40c are constructed similarly as in cases of the lighting unit body 20a and the pair of the light guiding members 20b and 20c, respectively. Further, the optical fiber 50 is fabricated similarly as in case of the optical fiber 80. Further, the pair of the light guiding members 40b and 40c are fixed in top and bottom grooves formed in the lighting unit body 40a, which grooves correspond to the top groove 28 and the bottom groove 25, respectively, similarly as in case of fixing the pair of the light guiding members 20b and 20c in the lighting unit body 20a. Furthermore, the lighting unit body 40a and the core of the optical fiber 50 are molded as incorporating with each other, similarly as in case of molding the lighting unit body 20a and the core of the optical fiber 30. Incidentally, the cladding of the optical fiber 50 and the gaps formed between the light guiding members and the grooves of the lighting unit body 40a are processed similarly as in cases of the cladding of the optical fiber 30 and the gaps formed between the light guiding members and the grooves of the lighting unit body 20a. Additionally, as shown in FIG. 1, the optical fiber 50 is bent and shaped like a character L and is fitted into the central portion of the left side wall 11a of the light source 10. Further, an angle of incidence of light, which is emitted by the light source 10, from the incident end surface of the core of the optical fiber 50 ranges from 5 to 30 degrees.

In the first embodiment constructed as above described, when light emitted from the light source 10 is incident on the incidence surfaces of the cores of the optical fibers 80 and 50 through the left side wall 11a and the right side wall 11b at incidence angles ranging from 5 to 80 degrees, respectively, the incident light is refracted at a refracting angle of 15 degrees in each of the optical fibers 30 and 50. Then, the refracted light is guided by and propagates along the core of each of the optical fibers by being reflected by the inner wall of the core thereof. Thereafter, light emitted from the emitting surface of the optical fiber 30 is incident on the lighting device 20 of the head lamp L. In such a case, the light emitted from the optical fiber 30 is not reflected by water, dusts or the like in a portion coupling the core of the optical fiber 30 with the lighting unit body 20a because the core of the optical fiber 30 and the lighting unit body 20 are made of the same material and are molded as incorporating with each other. Further, light can be incident from the optical fiber 30 on the lighting unit body 20a highly efficiently. Moreover, the optical system of the head light L can be fabricated at low cost. Furthermore, light can be incident from the optical fiber 30 on the lighting unit body 20b very efficiently because of the fact that the light guiding member 20b is fixed to the optical fiber 30 by transparent adhesive. It is the same with the incidence of light from the optical fiber 30 on the light guiding member 20c.

Figure 3B:
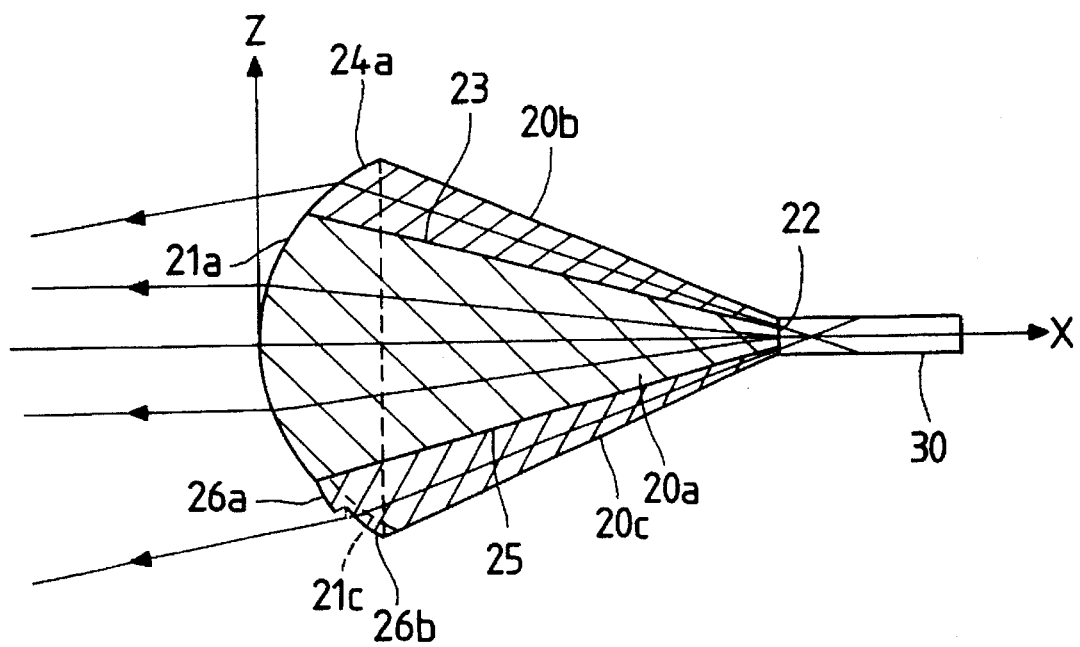
FIG. 3(B) is a vertical sectional view of the lighting unit of FIG. 2.
Figure 4A:
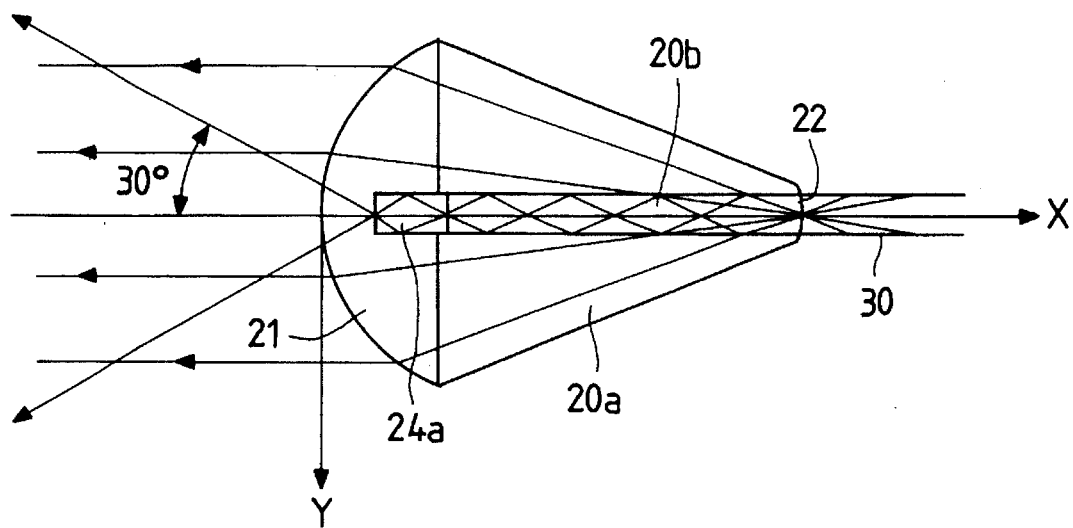
FIG. 4(A) is a plan view of the lighting unit of FIG. 2.

As described above, the focal point F of the emitting surface 21 of the lighting unit body 20a is in the vicinity of the incidence surface 22 thereof. Thus, as illustrated in FIGS. 3(B) and 4(A), the light having been incident on the lighting unit body 20a as above described propagates from the incidence surface 22 of the body 20a through the lighting device body 20a as being radiated from the incidence surface 22 and reaches the emitting surface 21. Thereafter, the rays of the light, which have been radiated from the incidence surface 22 and reached the emitting surface 21, are emitted therefrom in parallel to X-axis, namely, the optical axis thereof as illustrated in these figures. In such a case, the parallel rays of the light emitted from the first emitting surface portion 21a of the lighting unit body 20a form what is called a "hot zone" as a result of clear image formation of the light source, which is achieved in connection with the above-mentioned position of the focal point F. Thus the head lamp of the vehicle can be prevented from blinding the driver of an oncoming car. Moreover, the head lamp of the vehicle can illuminate with high luminance forward of the vehicle up to a distant place.

Further, in comparison with the refractive index of the light guiding member 20b, the refractive index of each of the gap formed between the left side of the member 20b and that of the groove 23 and the gap formed between the right side of the member 20b and that of the groove 23 is small. This results in that there is no light coming through the left and right sides of the light guiding member 20b. Thus the light having been incident on the light guiding member 20b propagates through the inside of the member 20b by undergoing total internal reflections on the left and right side surfaces thereof by turns as illustrated in FIG. 4(A). As the result, the light guided in this way is emitted from the light emitting surface 24a of light guiding member 20b in such a manner that the (transverse) luminous intensity distribution curve of the emitted light is a rectangle, the vertical side of which is shorter than the horizontal side thereof (namely, the vertical side of the rectangle is relatively short and the horizontal side of the rectangle is relatively long). In such a case, a divergence angle in the horizontal direction of the divergent bundle of the rays of the emitted light reaches 60 degrees. Further, as above stated, the focal point of the light emitting surface 24a of the light guiding member 20b, which surface serves as the lens surface in the direction along Z-axis, is set as being in the vicinity of the coupling portion between the light guiding member 20b and the optical fiber 30. Thus light originated from the clear image formation of the light source can be emitted from the light emitting surface 24a forward of the vehicle without being provided with shades or the like differently from the conventional device and without light which comes through the lighting unit and is emitted upwardly from the surface 24a. As the result, the driver of an oncoming car is not blinded by the light emitted from the head lamp of this vehicle. This is substantially the same with the light guiding member 20c except that light emitted from the emitting surface portions 26a and 26b is dimmed somewhat.

Figure 4B:
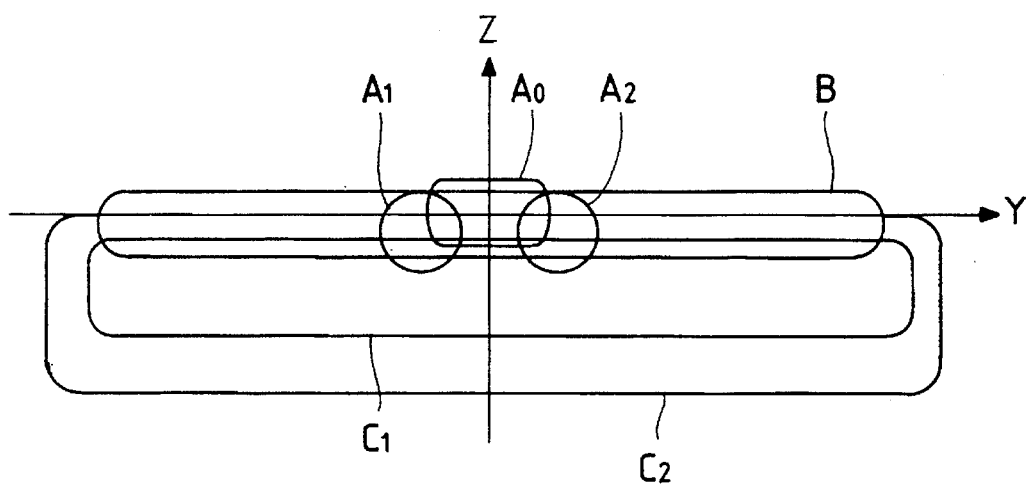
FIG. 4(B) is a diagram illustrating the (transverse) luminous intensity distribution curves of the light emitted by the lighting unit of FIG. 2.

Incidentally, the luminous intensity distribution curve of light emitted from the head lamp L of the first embodiment of the present invention was studied by conducting experiments. The results of the experiments are shown in FIG. 4(B). In this figure, reference character A0 designates the luminous intensity distribution curve of light irradiated from the first emitting surface portion 21a of the lighting unit 20. Further, reference characters A1 and A2 represent the luminous intensity distribution curve of light emitted from the second emitting surface portion 21b of the unit 20 and that of light emitted from the third emitting surface portion 21c of the unit 20, respectively. Moreover, reference character B denotes the luminous intensity distribution curve of light emitted from the light emitting surface 24a of the light guiding member 20b. Additionally, reference characters C1 and C2 designate the luminous intensity distribution curve of light emitted from the emitting surface portion 26a of the light guiding member 20c and the luminous intensity distribution curve of light emitted from the emitting surface portion 26b of the light guiding member 20c, respectively.

Thus, in case of the first embodiment of the present invention, the head lamp L having the lighting unit 20 and the optical fiber 30 is constructed by setting the shapes of the lighting unit body 20a and the light guiding members 20b and 20c and the focal points of lens surfaces formed therein as above described. Thereby, the lighting device for used in a vehicle, which is of the optical fiber type and has a high degree of freedom concerning the luminous intensity distribution, can be provided. This is the same with the head lamp R. In such a case, the high degree of freedom concerning the luminous intensity distribution makes fine regulation of the luminous intensity distribution of light emitted from the device possible. Consequently, vehicular safety based on visual cognition can be raised considerably. Further, with the above described configuration, the luminous intensity distribution, by which the driver of an oncoming car can be prevented from being blinded, can be ensured without shutting out light to be emitted from the vehicle. Thereby, a head light with little loss of light can be provided. Additionally, as described above, the single light source 10 is employed in common for the head lamps L and R in case of the first embodiment. Therefore, such a kind of a lighting device can utilize light with high efficiency.

Incidentally, in case of the first embodiment of the present invention, a gap having a predetermined width is formed between the left side of the light guiding member 20b and that of the top groove 23 and another gap having a predetermined width is similarly formed between the right side of the light guiding member 20b and that of the top groove 23. However, instead of this, the light guiding member 20b may be made of a material, which has a refractive index smaller than that of the lighting unit body 20a, and moreover the left and right sides of the member 20b may be airtightly coupled to the left and right sides of the top groove 23. This is the same with the light guiding member 20c, with the light guiding members to be coupled to the lighting unit body 40a and with the lighting unit 40 of the head lamp R.

Further, in case of the first embodiment of the present invention, the curves indicated by the reference characters A1 and A2 of FIG. 4(B) are employed as the luminous intensity distribution curve of light emitted from the second emitting surface portion 21b of the lighting unit body 20a and that of light emitted from the third emitting surface portion 21c of the lighting unit body 20a, respectively. Moreover, the curves indicated by the reference characters C1 and C2 of FIG. 4(B) are employed as the luminous intensity distribution curve of light emitted from the emitting surface portion 26a of the light guiding member 20c and that of light emitted from the emitting surface portion 26b of the light guiding member 20c, respectively. Instead of employing such luminous intensity distribution curves, the device may be constructed as will be described below. Namely, for instance, the light guiding member 20c and the bottom groove 25 of the lighting unit 20a may be omitted. Further, the emitting surface portions of the light emitting surface 21 of the lighting unit body 20a respectively corresponding to the emitting surface portions 21b, 21c, 26a and 26b are replaced with a single cylindrical concave lens surface which is linear in the vertical direction (namely, the direction along Z-axis) as viewed in FIG. 2 and is seen like a concave surface from the front of the lighting unit body 20a in the horizontal direction (namely, the direction along Y-axis) as viewed in this figure. In such a case, in place of each of the curves A1, A2, C1 and C2, a new luminous intensity distribution curve, which is relatively flat in the vertical direction and is relatively long in the horizontal direction, can be obtained from light emitted by the cylindrical concave lens surface at the luminous intensity distribution position corresponding to the curve C1 without the light guiding member 20c by suitably setting the position of the focal point of the cylindrical concave lens surface. This is the same with the lighting unit body 40a.

Moreover, in case of the first embodiment of the present invention, the curve indicated by the reference character B of FIG. 4(B) is employed as the luminous intensity distribution curve of light emitted from the light emitting surface 24a of the light guiding member 20b of the lighting unit 20. Instead of employing such a luminous intensity distribution curve, the device may be constructed as will be described below. Namely, for instance, the light guiding member 20b and the bottom groove 23 of the lighting unit 20a may be omitted. Further, a first emitting surface portion of the light emitting surface 21 of the lighting unit body 20a corresponding to the light emitting surface 24a and second and third emitting surface portions respectively positioned at the left and right sides of the first emitting surface portion are replaced with a single cylindrical concave lens surface which is linear in the vertical direction (namely, the direction along Z-axis) as viewed in FIG. 2 and is seen like a concave surface from the front of the lighting unit body 20a in the horizontal direction (namely, the direction along Y-axis) as viewed in this figure. In such a case, in place of the curves B, a new luminous intensity distribution curve, which is relatively flat in the vertical direction and is relatively long in the horizontal direction, can be obtained from light emitted by the cylindrical concave lens surface at the luminous intensity distribution position corresponding to the curve B without the light guiding member 20b by suitably setting the position of the focal point of the cylindrical concave lens surface. This can be also realized by omitting the light guiding member 40b of the lighting unit 40 and the corresponding top groove of the lighting unit body 40a.

Figure 5:
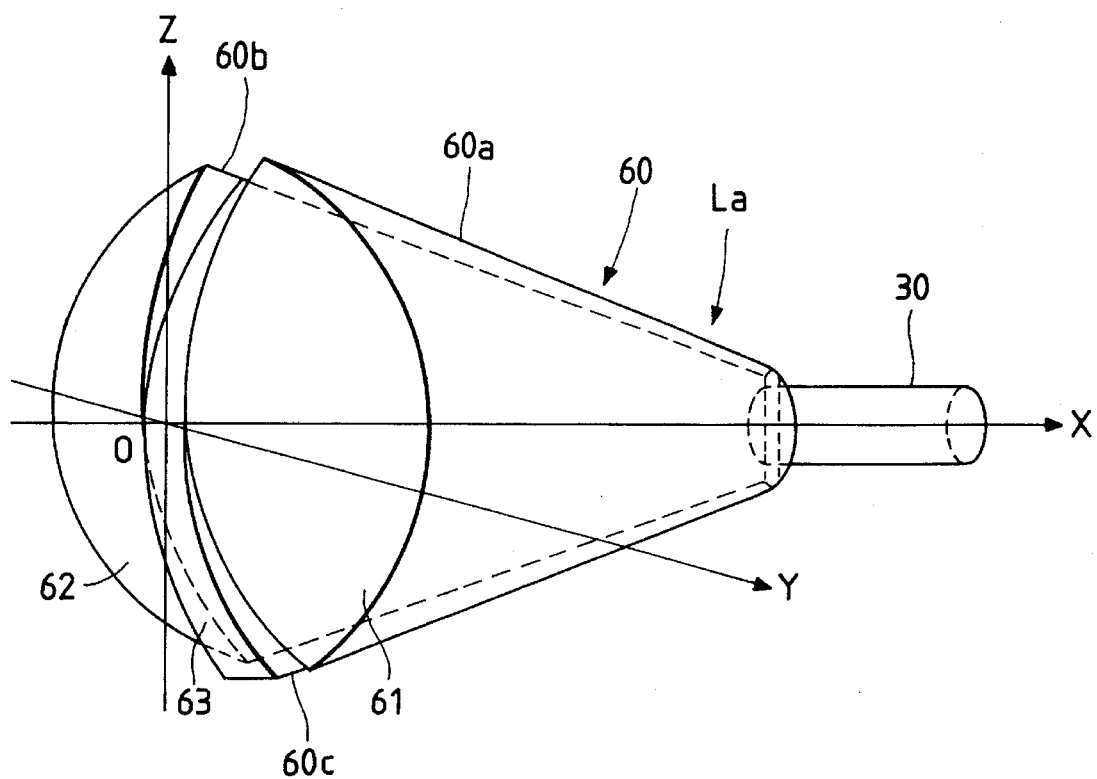
FIG. 5 is an enlarged perspective view of a primary part of another lighting device, namely, a left-side head lamp (hereunder sometimes referred to as a second embodiment) of the present invention.

Next, the second embodiment of the present invention will be described hereinafter by referring to FIG. 5. The second embodiment of the present invention is characterized in that a head lamp La (to be described later) is employed instead of the head lamp L of the first embodiment of the present invention. This head lamp La consists of a lighting unit 60 and the optical fiber 30 employed in the first embodiment of the present invention. The lighting unit 60 is comprised of a pair of lighting unit bodies 60a and 60b, which are made of the same material as of the lighting unit body 20a and are shaped like a nearly semi-circular cone, and a plate-like light guiding member 60c held between the lighting unit bodies 60a and 60b.

Figure 6A:
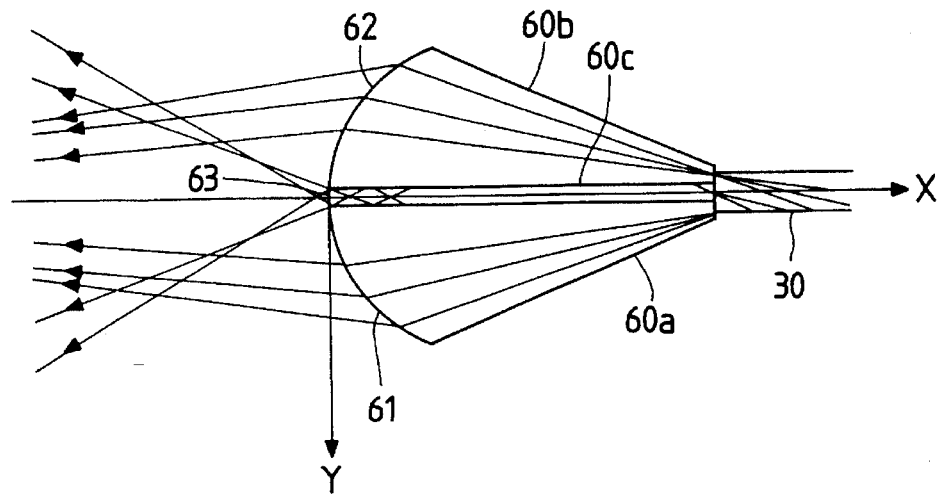
FIG. 6(A) is a plan view of the lighting device of FIG. 5.
Figure 6B:
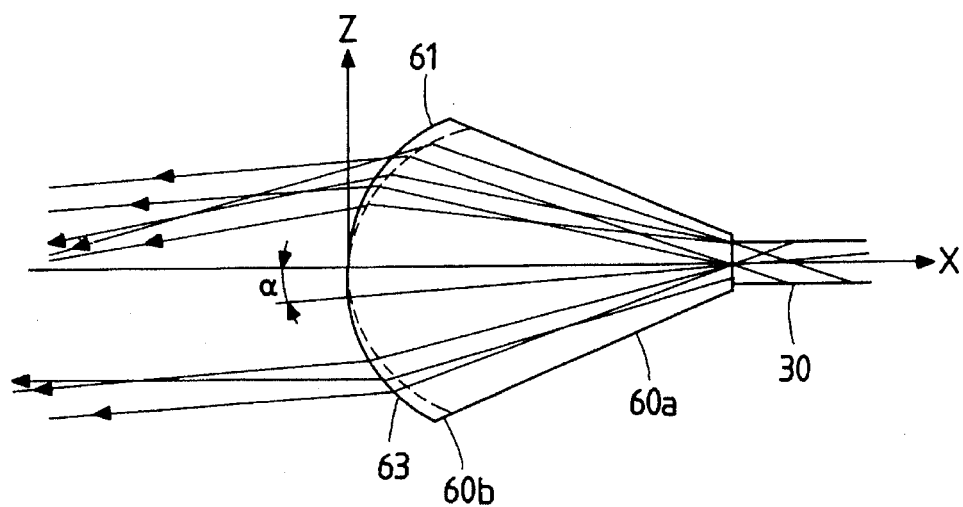
FIG. 6(B) is a left side view of the lighting device of FIG. 5.

Each of the light emitting surface 61 of the lighting unit body 60a and the light emitting surface 62 of the lighting unit body 60b forms a lens surface. The focal point of each of the light emitting surfaces 61 and 62 is set similarly as in case of the focal point of the light emitting surface of the lighting unit body 20a of the first embodiment of the present invention. The light guiding member 60c is made of the same material as in case of the light guiding member 20b of the first embodiment of the present invention. Further, a thin film made of a material, the refractive index of which is smaller than that of each of the lighting units bodies 60a and 60b and the light guiding member 60c, is inserted between the light guiding member 60c and each of the lighting unit bodies 60a and 60b. The light guiding member has a light emitting surface 63 which is placed an angle of α away from each of the light emitting surface 61 of the lighting unit body 60*a* and the light emitting surface 62 of the lighting unit body 60*c* with respect to the origin (corresponding to the pole 0) in XZ coordinate plane, as shown in FIGS. 5 and 6(B). The incidence surfaces of the lighting unit bodies 60*a* and 60*b* incorporate with both of the edge portions of the light emitting end surface of the optical fiber 30. Moreover, the incidence surface of the light guiding member 60*c* is fixed to the central portion of the light emitting end surface of the optical fiber 30 by transparent adhesive. Further, after the optical fiber 30 and each of the lighting unit bodies 60*a* and 60*b* are molded integrally with one another, the thin films is inserted between the light guiding member 60*c* and each of the lighting unit bodies 60*a* and 60*b*. The remaining parts of the configuration of the second embodiment is the same as the corresponding parts of the first embodiment.

In the second embodiment constructed as described above, when light is emitted from the optical fiber 30 to the lighting unit 60, the emitted light is incident on the incidence surface of each of the lighting unit bodies 60*a* and 60*b* and the light guiding member 60*c*. Then, rays of the light having been incident on each of the lighting unit bodies 60*a* and 60*b* propagate therethrough by being radiated from the focal point of each of the light emitting surfaces 61 and 62 and thereafter are emitted from each of the surfaces 61 and 62 as parallel rays, as shown in FIGS. 6(A) and 6(B). As the result, the parallel rays of the emitted light form a "hot zone" similarly as in case of the first embodiment of the present invention. Thereby, the head lamp of the second embodiment can be prevented from blinding the driver of an oncoming car and also can illuminate with high luminance forward of the vehicle up to a distant place. Moreover, as above stated, a thin film made of a material having a the refractive index smaller than that of each of the lighting units bodies and 60*b* and the light guiding member 60*c*, is inserted between the light guiding member 60*c* and each of the lighting unit bodies 60*a* and 60*b*. Thus the light having been incident on the light guiding member 60*c* propagates through the member 60*c* by being guided therein by undergoing total inner reflections due to the thin film, as illustrated in FIG. 6(A).

Figure 6C:
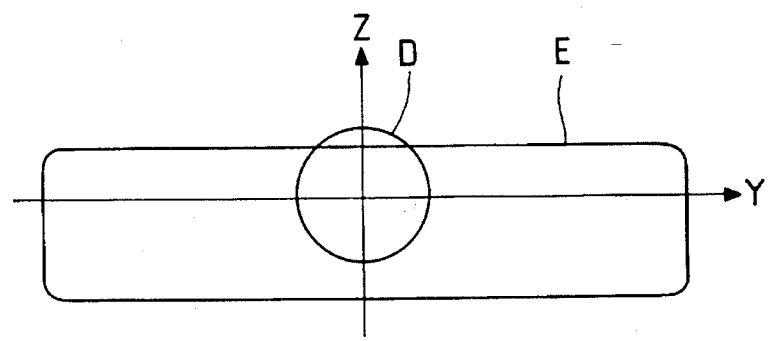
FIG. 6(C) is a diagram illustrating the (transverse) luminous intensity distribution curves of the light emitted by the lighting device of FIG. 5.

Further, the light guided in this manner is emitted in such a fashion that the corresponding luminous intensity distribution curve is relatively flat in the vertical direction and is relatively long in the traverse or horizontal direction as shown in FIGS. 6(A) and 6(B). In such a case, due to the angle of α, light is emitted from the light emitting surface 63 forwardly and downwardly as shown in FIG. 6(B). As the result, the emitted light does not blind a driver of an oncoming car at all. Incidentally, the luminous intensity distribution curve of the light emitted from the head lamp of the second embodiment of the present invention was studied by conducting experiments. The results of the experiments are shown in FIG. 6(C). In this figure, reference character D designates the luminous intensity distribution curve of light emitted from the light emitting surface of each of the lighting unit bodies 60*a* and 60*b*. Further, reference character E denotes the luminous intensity distribution curve of light emitted from the light emitting surface of the light guiding member 60*c*.

Next, the third embodiment of the present invention will be described hereinafter by referring to FIGS. 7 to 9. The third embodiment of the present invention is characterized in that a head lamp Lb (to be described later) is employed instead of the head lamp L of the first embodiment of the present invention. This head lamp Lb consists of a lighting unit 70 and the optical fiber 30 employed in the first embodiment of the present invention. The lighting unit 70 is comprised of a lighting unit body 70*a*, which is made of the same material as of the lighting unit body 20*a* of the first embodiment and is shaped like a nearly semi-circular cone, and a plate-like light guiding member 70*b*, which is made of the same material as in case of the light guiding member 20*b* of the first embodiment, and a pair of plate-like shades 70*c* and 70*d*.

The lighting unit body 70*a* is placed directly upon the light guiding member 70*b* and extends in the same direction in which the member 70*b* extends. Further, the lighting unit body 70*a* has the bottom surface thereof fixed onto the top surface of the light guiding member 70*b*. The light emitting surface 73 of the lighting unit body 70*a* forms a lens surface. Further, the focal point of the light emitting surface 73 is established similarly as the focal point of the light emitting surface of the lighting unit body 20*a* of the first embodiment. The light guiding member 70*b* serves to provide a luminous intensity distribution, the (transverse) luminous intensity distribution curve of which is relatively flat in the vertical direction, (incidentally, in the instant application, such a luminous intensity distribution is sometimes referred to as a flat luminous intensity distribution) by emitting light from the light emitting surface 74 thereof, substantially similarly as the light guiding member 20*b* of the first embodiment does. In such a case, the bottom surface 71 of the lighting unit body 70*a* and the top surface 72 of the light guiding member 70*b* are formed as mirror surfaces (namely, function as total reflection mirrors). The entire bottom surface 71 and the entire top surface 72 are parallel to the fiber axis (or central axis) of the optical fiber 30 and are offset, namely, shifted upwardly from the fiber axis of the optical fiber 30 by a predetermined interval $\Delta S_1$. The optical axis of the light guiding member 70*b* parallel to the fiber axis of the optical fiber 30 is offset, namely, shifted downwardly from the top surface 72 of the light guiding member 70*b* by a predetermined interval $\Delta S_2$, as illustrated in FIG. 8(A).

Further, the incidence surface of each of the lighting unit body 70*a* and the light guiding member 70*b* is fixed to the light emitting end surface of the optical fiber 30 through the corresponding one of the shades 70*c* and 70*d*. In such a case, the lower part of the incidence surface of the lighting unit body 70*a* and the upper part of the incidence surface of the light guiding member 70*b* are fixed to the central part of the light emitting end surface of the optical fiber 30 by transparent adhesive. Further, the lower edge portion 75 of the shade 70*c* intervenes between the upper part of the incidence surface of the lighting unit body 70*a* and the upper part of the light emitting end surface of the optical fiber 30. On the other hand, the upper edge portion 76 of the shade 70*d* intervenes between the the lower part of the incidence surface of the light guiding member 70*b* and the lower part of the light emitting end surface of the optical fiber 30. Incidentally, the bottom edge 75*a* of the left half of the lower edge portion 75 of the shade 70*c* is inclined upwardly and leftwardly at a predetermined angle $\Delta \theta_1$ to Y-axis as viewed in FIG. 9(A), for the purpose of enlarging the vertical range where the rays of the light emitted from the lighting unit body 70*a* of the device provided in the vehicle to a walker can reach. The remaining elements of the configuration of the third embodiment is similar to the corresponding elements of the first embodiment.

In case of the third embodiment constructed as above described, when light is emitted from the optical fiber 30 to the lighting unit 70, the emitted light is incident on the incidence surface of each of the lighting unit body 70*a* and the light guiding member 70*b*. In such a case, the refractive index hardly varies with positions in the coupling portion between the optical fiber 30 and the lighting unit 70. Thus a part of the light emitted from a portion of the light emitting end surface of the optical fiber 30, which portion corresponds to an area lying between the lower edge portion 75 of the shade 70c and the upper edge portion 76 of the shade 70d, is incident on each of the lighting unit body 70a and the light guiding member 70b.

Figure 8A:
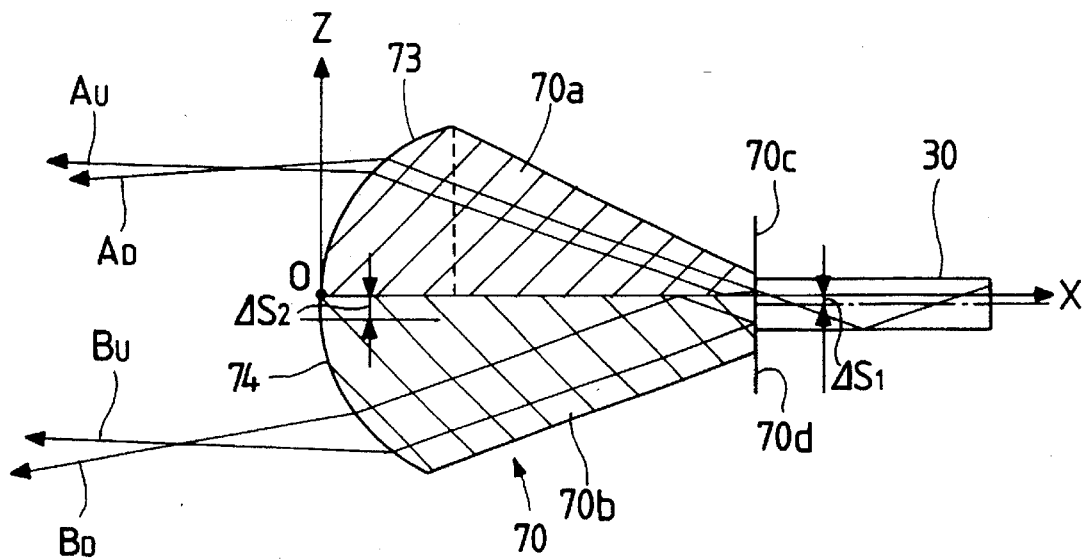
FIG. 8(A) is a vertical sectional view of the left-side head lamp of FIG. 7.
Figure 8B:
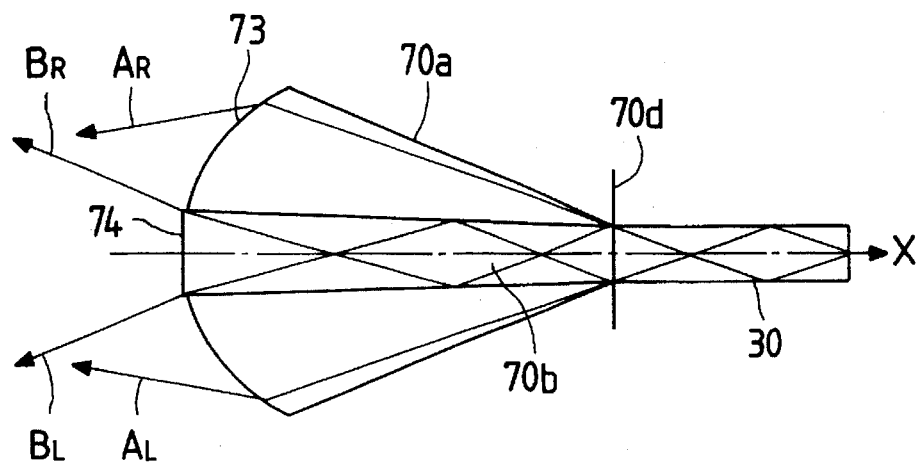
FIG. 8(B) is a bottom view of the left-side head lamp of FIG. 7.

Then, the rays of a part of light having been incident on the lighting unit body 70a, which part rectilinearly propagates in ZX-coordinate plane to the light emitting surface 73, are radiated in connection with the focal point of the surface 73 and propagates to the surface 73 and thereafter are emitted from the surface 73 forward of the vehicle downwardly as parallel rays AD of FIG. 8(A). On the other hand, the rays of another part of the light having been incident on the lighting unit body 70a, which part is reflected by the bottom surface 71 and thereafter rectilinearly propagates in ZX-coordinate plane to the light emitting surface 73, are radiated in relation to the focal point of the surface 73 and propagates to the surface 73 and thereafter are emitted from the surface 73 forward of the vehicle in the direction substantially parallel to X-axis as parallel rays AU of FIG. 8(A). Moreover, the rays of a further part of light having been incident on the lighting unit body 70a, which part rectilinearly propagates in YX-coordinate plane to the light emitting surface 73, are radiated in connection with the focal point of the surface 73 and propagates to the surface 73 and thereafter are emitted from the surface 73 forward of the vehicle in a convergent manner as symmetrical parallel rays AR and AL of FIG. 8(B).

Further, the rays of a part of light having been incident on the light guiding member 70b, which part rectilinearly propagates in ZX-coordinate plane to the light emitting surface 74, are radiated in relation to the focal point of the surface 74 and propagates to the surface 74 and thereafter are emitted from the surface 74 forward of the vehicle substantially in parallel with X-axis in relation to the predetermined interval $\Delta S_2$ as parallel rays BU of FIG. 8(A). On the other hand, the rays of another part of light having been incident on the light guiding member 70b, which part rectilinearly propagates in ZX-coordinate plane to the light emitting surface 74 after reflected by the top surface 72 thereof, are radiated in connection with the focal point of the surface 74 and propagates to the surface 74 and thereafter are emitted from the surface 74 forward of the vehicle downwardly as parallel rays BD of FIG. 8(A). Further, the rays of a further part of light having been incident on the light guiding member 70b, which part propagates by being reflected in YX-coordinate plane to the light emitting surface 74, are emitted from the surface 74 forward of the vehicle in a divergent manner as symmetrical parallel rays BR and BL of FIG. 8(B).

Incidentally, the luminous intensity distribution curve of light emitted from the head lamp L6 of the third embodiment of the present invention was studied by conducting experiments. The results of the experiments are indicated by solid and dashed curves in FIG. 9(B). In this figure, reference character F designates the luminous intensity distribution curve (indicated by a solid curve) of light AU and AD irradiated from the light emitting surface of the lighting unit body 70a. In this case, an upper half part FU of the solid curve F, which part is drawn between the points f1 and f2, is obtained from the light AU. On the other hand, a lower half part FD of the solid curve F, which part is also drawn between the points f1 and f2, is obtained from the light AD. Further, as viewed in this figure, a nearly triangular portion of the upper half part FU protrudes upwardly and leftwardly, and in contrast, a nearly triangular portion of the lower half part FD protrudes downwardly and leftwardly. This is due to the shape of the bottom edge 75a of the lower edge portion 75 of the shade 70c. Thereby, the left-side part (namely, a part facing a sidewalk) of the luminous intensity distribution curve F is larger than the right-side part (namely, a part facing a oncoming car) of the curve F as viewed in this figure. As the result, the driver of the vehicle provided with this lamp can easily detect a walker (additionally, the walker also can easily detect the vehicle) and moreover a driver of an oncoming car cannot be blinded by light emitted from this head lamp. Furthermore, reference character G denotes the luminous intensity distribution curve (indicated by a dashed or dotted curve) of light BU and BD.

Figure 9A:
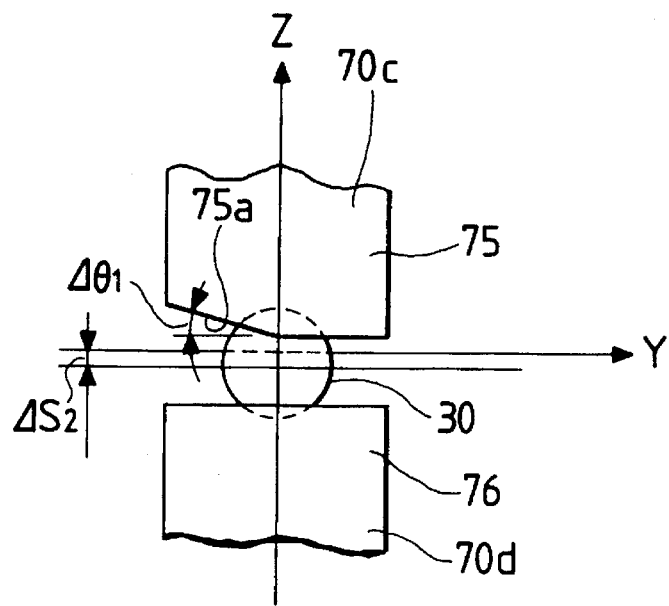
FIG. 9(A) is a plan view of both of shades of the left-side head lamp of FIG. 7.
Figure 9B:
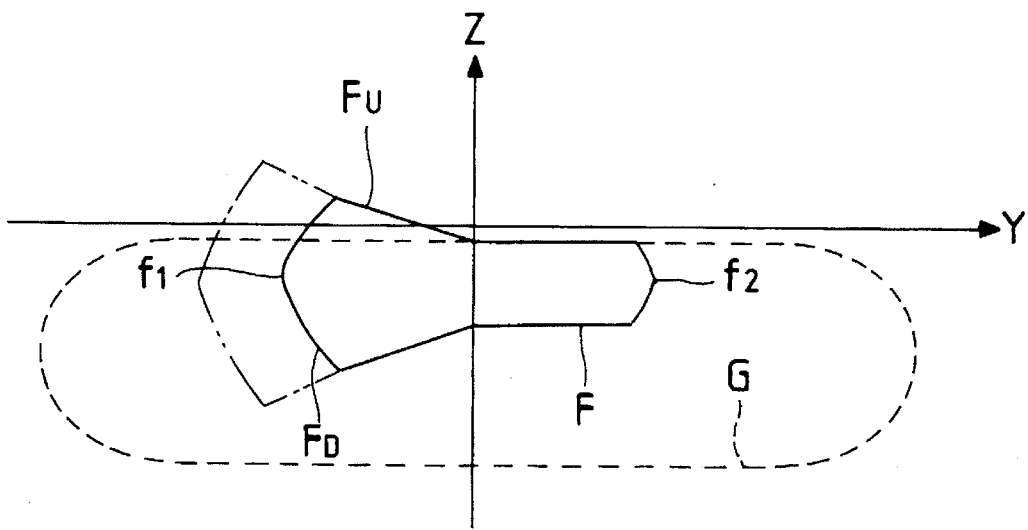
FIG. 9(B) is a diagram for illustrating the (transverse) luminous intensity distribution curves of the light emitted from the emitting surface of the left-side head lamp of FIG. 7.
Figure 10A:
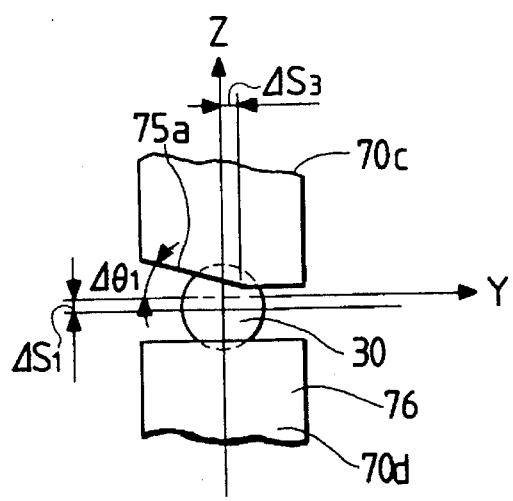
FIG. 10(A) is a plan view of modifications of both of the shades of the left-side head lamp of the third embodiment of the present invention.

Incidentally, in case of the third embodiment, the bottom edge 75a of the shade 70c is tilted upwardly from the traverse center of the shade 70c. However, as illustrated in FIG. 10(A), the bottom edge 75a of the shade 70c may be inclined upwardly from a position shifted from the traverse center of the shade 70c by a predetermined distance $\Delta S_3$. As the result, the left-side part of the luminous intensity distribution curve F of FIG. 9(A) is enlarged to the left as indicated by two-dot chain line of this figure. Consequently, the driver of the vehicle can detect a walker more easily.

Figure 10B:
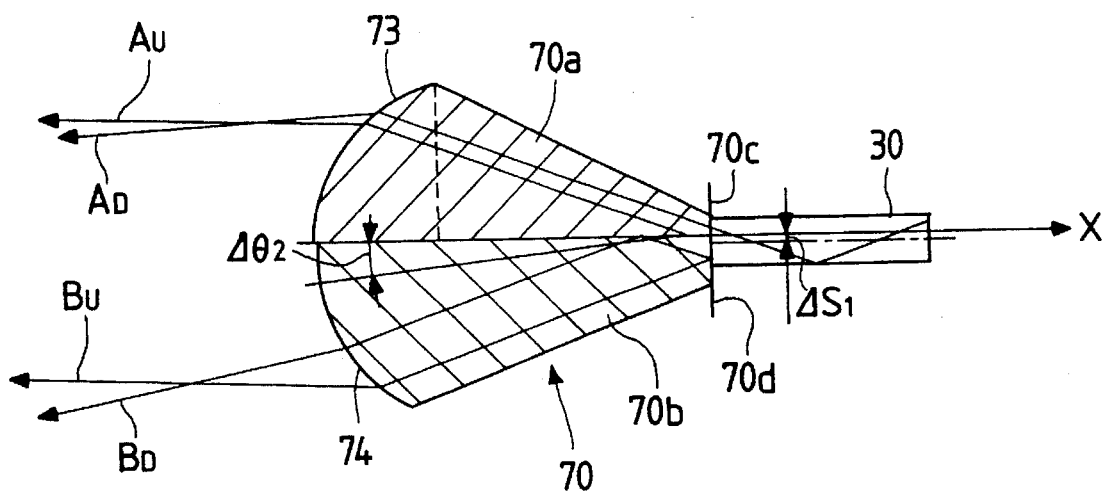
FIG. 10(B) is a vertical sectional view of a modification of the lighting device (namely, the third embodiment) of the present invention.

Further, in case of the third embodiment, the top surface 72 of the light guiding member 70b is apart from the optical axis of the light guiding member 70b by the predetermined interval $\Delta S_2$ as described above. Instead of this, the optical axis of the light guiding member 70b may be rotated around the top end of the incidence surface of the light guiding member 70b by a predetermined angle of $\Delta \theta_2$ as illustrated in FIG. 10(B). Thereby, the luminous intensity distribution curves of light emitted by the device constructed in such a manner can be obtained as the solid and dashed curves of FIG. 9(B).

Figure 11A:
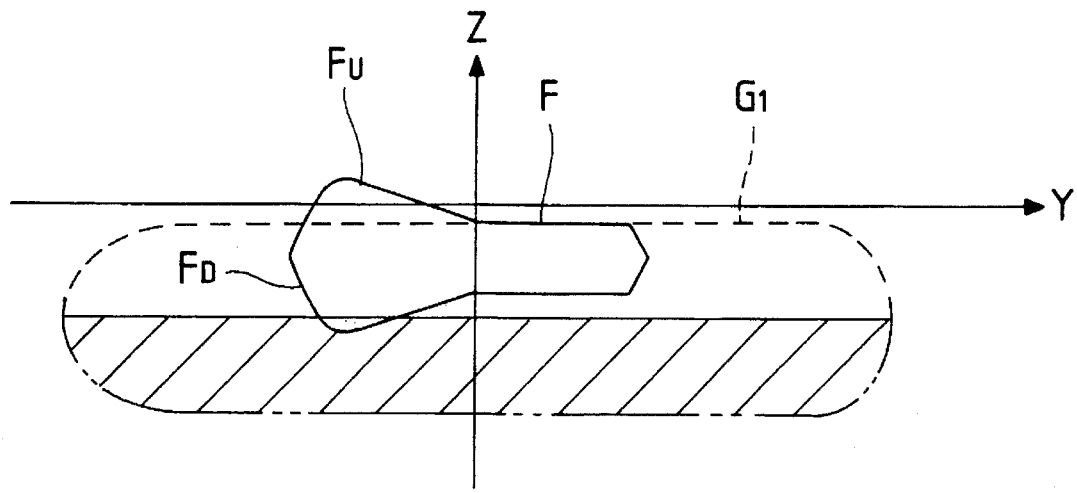
FIG. 11(A) is a diagram for illustrating the (transverse) luminous intensity distribution curves of the light emitted from the emitting surface of a lighting unit of FIG. 10(B)

Moreover, in case of the third embodiment of the present invention, the top surface 72 of the light guiding member 70 is formed as a mirror surface. However, instead of this, the top surface 72 of the light guiding member 70 may be roughly finished in such a manner to cause loss of light thereon. In this case, the light, which is incident on the light guiding member 70b and propagates therethrough to the top surface 72 thereof, is not reflected by the surface 72 and any loss of the light occurs thereon. Therefore, the light emitted from the light emitting surface 74 of the light guiding member 70b includes only light coming from parts other than the top surface 72 thereof. As the result, the luminous intensity distribution curve indicated by a dashed curve G1 of FIG. 11(A), which curve can be obtained by deleting the lower half (corresponding to the outer periphery (i.e., two-dot chain curve) of the hatched part of FIG. 11(A)) of the luminous intensity distribution curve G of FIG. 9(B) therefrom, is obtained as the luminous intensity distribution curve of the light emitted from the light emitting surface 74 of the light guiding member 70b.

Figure 11B:
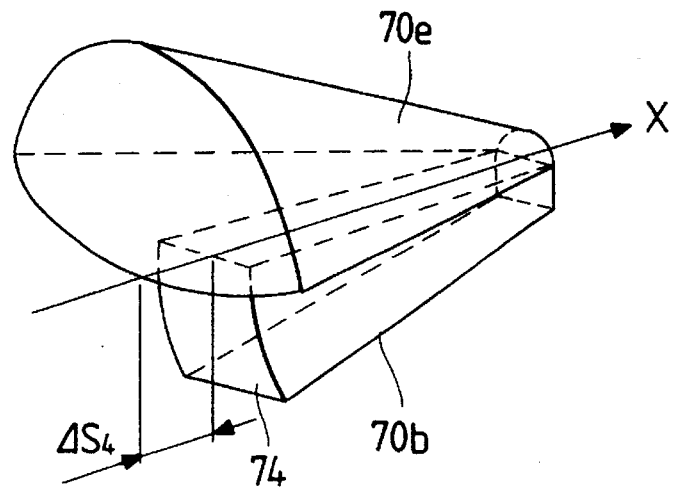
FIG. 11(B) is a perspective view of another modification of the lighting unit of the third embodiment of the present invention.

Furthermore, in case of the third embodiment, the length of the lighting unit body 70a in the direction along X-axis is equal to that of the light guiding member 70b in the same direction. However, the present invention is not limited to this. Namely, as illustrated in FIG. 11(B), another lighting unit body 70e, the length of which is longer than the total length of the light guiding member 70b by $\Delta S_4$, may be employed in place of the lighting unit body 70a and may protrude from the light emitting surface of the light guiding member 70b forward thereof by a length $\Delta S_4$. Thereby, a refractive angle of light emitted from the light emitting surface of the lighting unit body 70e to this light emitting surface thereof becomes smaller than a refractive angle of light emitted from the light emitting surface of the lighting unit body 70a to this light emitting surface thereof. Thus the luminous intensity distribution curve of the light emitted from the light emitting surface of the lighting unit body 70e becomes similar to but becomes smaller than the luminous intensity distribution curve represented by the solid curve F of FIG. 9(B). As the result, what is called a light irradiation density of the "hot zone" becomes increased. Consequently, an oncoming car can be illuminated more brightly.

Figure 12A:
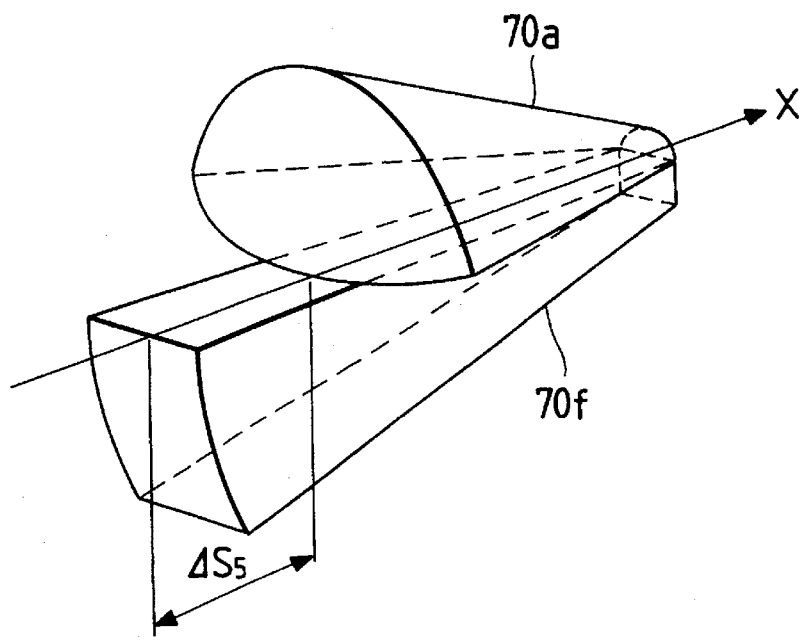
FIG. 12(A) is a perspective view of a further modification of the lighting unit of the third embodiment of the present invention.

Additionally, as illustrated in FIG. 12(A), another light guiding member 70f, the length of which is longer than the total length of the lighting unit body 70a by $\Delta S_5$, may be employed in place of the light guiding member 70b and may protrude from the light emitting surface of the lighting unit body 70a forward thereof by a length $\Delta S_5$. Thereby, a refractive angle of light emitted from the light emitting surface of the light guiding member 70f to this light emitting surface thereof becomes smaller than a refractive angle of light emitted from the light emitting surface of the light guiding member 70b to this light emitting surface thereof. Thus the luminous intensity distribution curve of the light emitted from the light emitting surface of the light guiding member 70f becomes a curve obtained by reducing the size of the luminous intensity distribution curve represented by the dashed curve G of FIG. 9(B) but by fixing the top position of the curve as indicated in this figure. As the result, what is called a light irradiation density of an area in front of the vehicle to be illuminated by light corresponding to the luminous intensity distribution curve obtained in this way (hereunder sometimes referred to as a flat luminous intensity distribution area) becomes increased. Consequently, such a flat luminous intensity distribution area, which is in front of the vehicle and in the side of the vehicle facing a side-walk, can be illuminated more brightly.

Figure 12B:
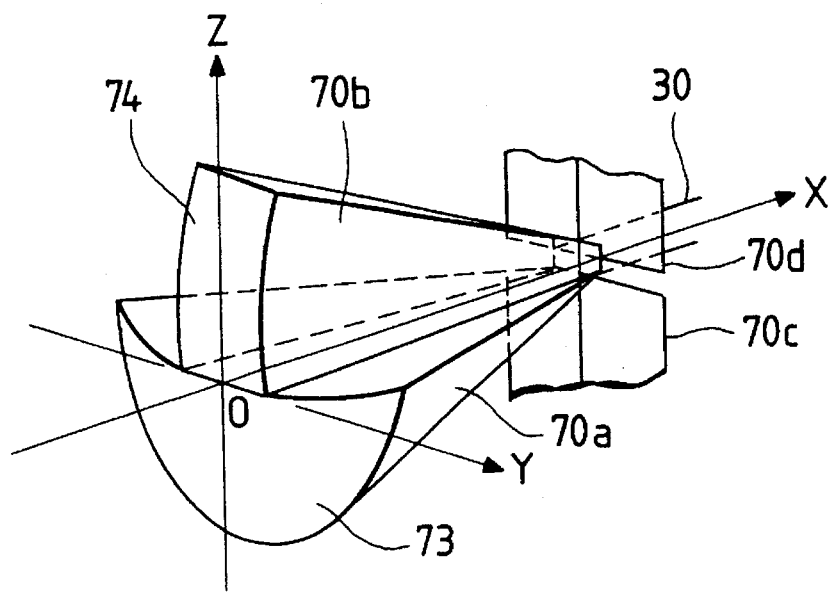
FIG. 12(B) is a perspective view of a modification of the lighting unit of the left-side head lamp (namely, the third embodiment) of the present invention.
Figure 13A:
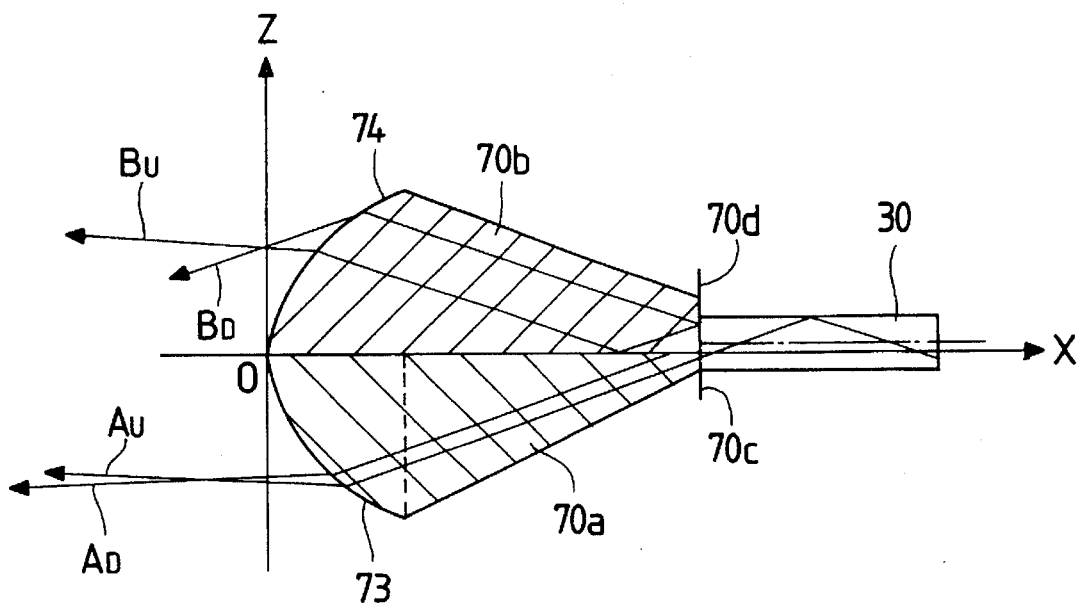
FIG. 13(A) is a vertical sectional view of the lighting unit of the left-side head lamp of FIG. 12(B)
Figure 13B:
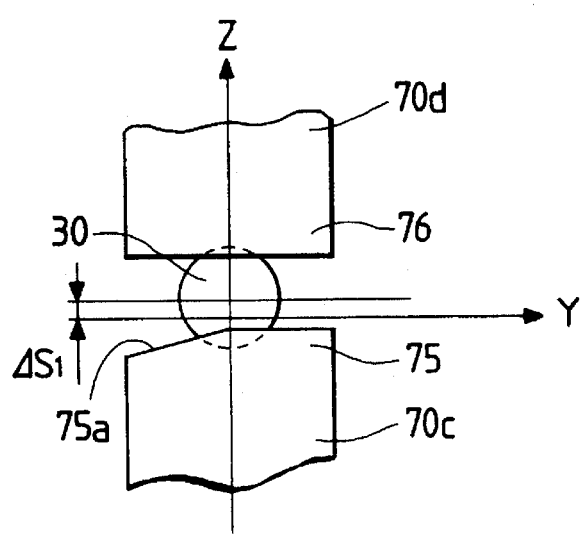
FIG. 13(B) is a plan view of both of shades of the left-side head lamp of FIG. 12(B)

Further, in case of the third embodiment, the lighting unit body 70a and the light guiding member 70b are placed upon and under XY coordinate plane, as shown in FIG. 7. Instead of this, the lighting unit body 70a and the light guiding member 70b may be turned upside down as illustrated in FIG. 12(B). In such a case, as compared with the configuration of FIG. 10(A), the shades 70d and 70c are inverted as illustrated in FIG. 13(B). Moreover, in comparison with the solid and dashed curves of FIG. (B), the luminous intensity distribution curves of light AU and AD emitted from the lighting unit body 70a and light BU and BD emitted from the light guiding members 70c and 70d as illustrated in FIG. 13(A) are upside-down with respect to XY coordinate plane.

Figure 14A:
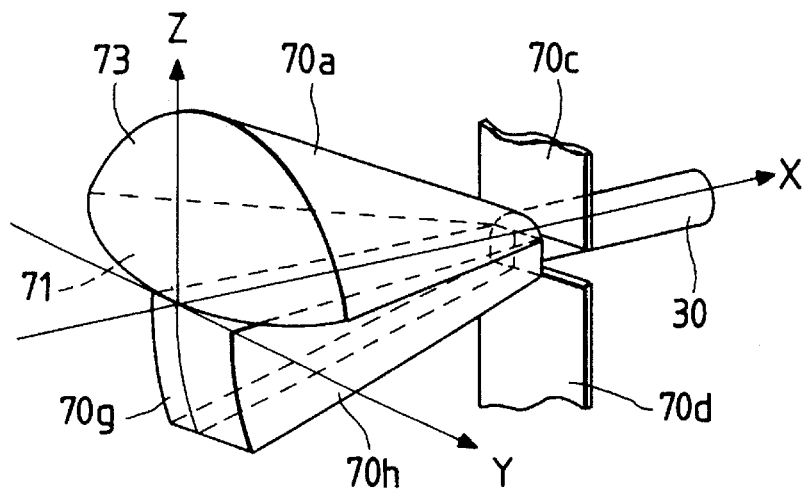
FIG. 14(A) is an enlarged perspective view of a primary part of a left-side head lamp (namely, a fourth embodiment) of the present invention.

Next, the fourth embodiment of the present invention will be described hereunder by referring to FIG. 14. The fourth embodiment of the present invention is characterized in that a pair of light guiding members 70g and 70h (to be described later) united or connected with each other as illustrated in FIG. 14(A) are employed instead of the light guiding member 70b of the third embodiment of the present invention. The light guiding member 70g has substantially the same structure as the light guiding member 70b does, except that the tapering degree in the forward direction of the light guiding member 70g along X-axis is small in comparison with the tapering degree in the forward direction of the light guiding member 70b along X-axis. Further, the light guiding member 70h has substantially the same structure as the light guiding member 70b does. As illustrated in FIG. 14(A), the connection surfaces of the light guiding members 70g and 70h are placed in XA coordinate plane. Moreover, the top surface of each of the light guiding members 70g and 70h is fixed to the bottom surface 71 of the lighting unit body 70a. Furthermore, the incidence surface of each of the light guiding members 70g and 70h faces a corresponding half part of the light emitting surface of the optical fiber 30. Incidentally, a gap layer (or an opaque layer) is formed between the connection surfaces of the light guiding members 70g and 70h. As the result, a part of the light, which has been incident on the light guiding members 70g and 70h and goes to the connection surfaces, undergoes a total inner reflection on the connection surfaces.

Figure 14B:
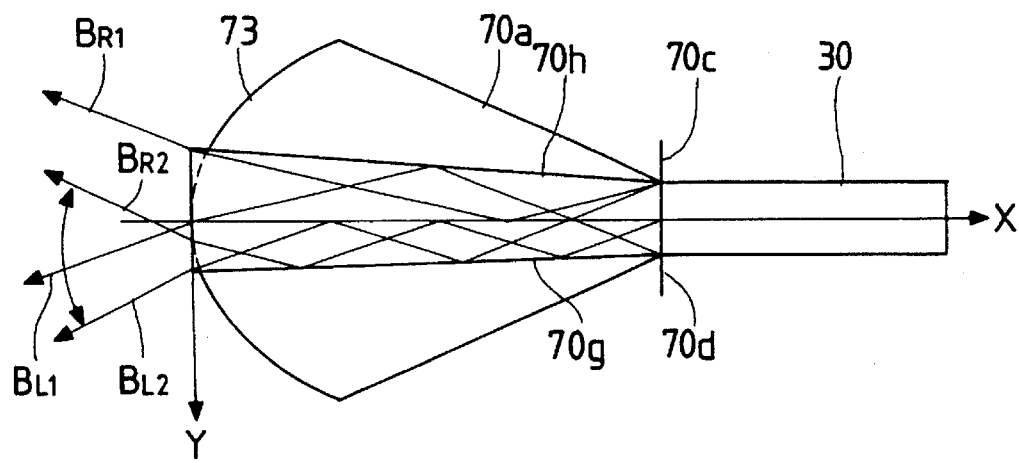
FIG. 14(B) is a bottom view of a lighting unit of the left-side head lamp (namely, the fourth embodiment) of the present invention.
Figure 14C:
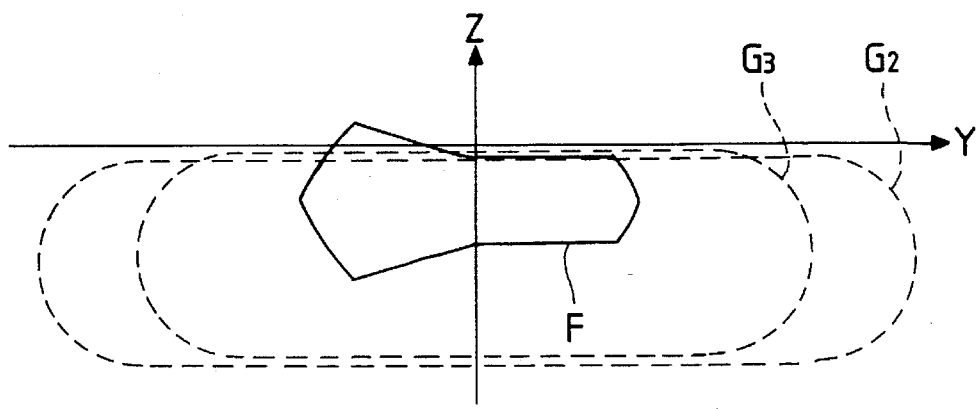
FIG. 14(C) is a diagram illustrating the (transverse) luminous intensity distribution curves of the light emitted from the emitting surface of the lighting unit of the left-side head lamp (namely, the fourth embodiment) of the present invention.

Thus, the rays of a part of light having been incident on the light guiding member 70h, which part propagates by being reflected in YX-coordinate plane to the light emitting surface thereof, are emitted from this light emitting surface forward of the vehicle in a divergent manner as symmetrical parallel rays $BR_1$ and $BL_1$ of FIG. 14(B). On the other hand, the rays of a part of light having been incident on the light guiding member 70g, which part propagates by being reflected in YX-coordinate plane to the light emitting surface thereof, are emitted from this light emitting surface forward of the vehicle in a divergent manner as symmetrical parallel rays $BR_2$ and $BL_2$ of FIG. 14(B). In such a case, the tapering degree of the light guiding member 70g is smaller than that of the light guiding member 70h. As the result, a diverging angle determined by the light $BR_2$ and $BL_2$ is larger than another diverging angle determined by the light $BR_1$ and $BL_1$. Therefore, the luminous intensity distribution curves of rays emitted from the light guiding members 70g and 70h become as the dashed curves G2 and G3 of FIG. 14(C), respectively. Further, the width in the direction along Y-axis of the luminous intensity distribution curve G2 becomes larger than that in the direction along Y-axis of the luminous intensity distribution curve G3 due to the difference in the tapering degrees of the light guiding members 70g and 70h. Moreover, the light irradiation density becomes high in an overlapping area between the luminous intensity distribution curves G2 and G3. Therefore, as compared with the overlapping area between the luminous intensity distribution curves G2 and G3, the degree of easiness in detecting a walker by the driver of the vehicle increases in non-overlapping areas of the curves G2 and G3.

Figure 15A:
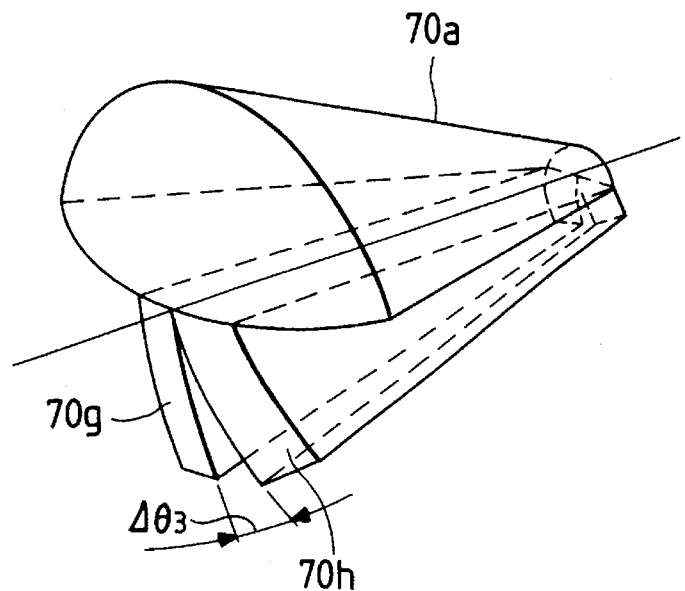
FIG. 15(A) is a perspective view of a modification of the lighting unit of FIG. 14(A)
Figure 15B:
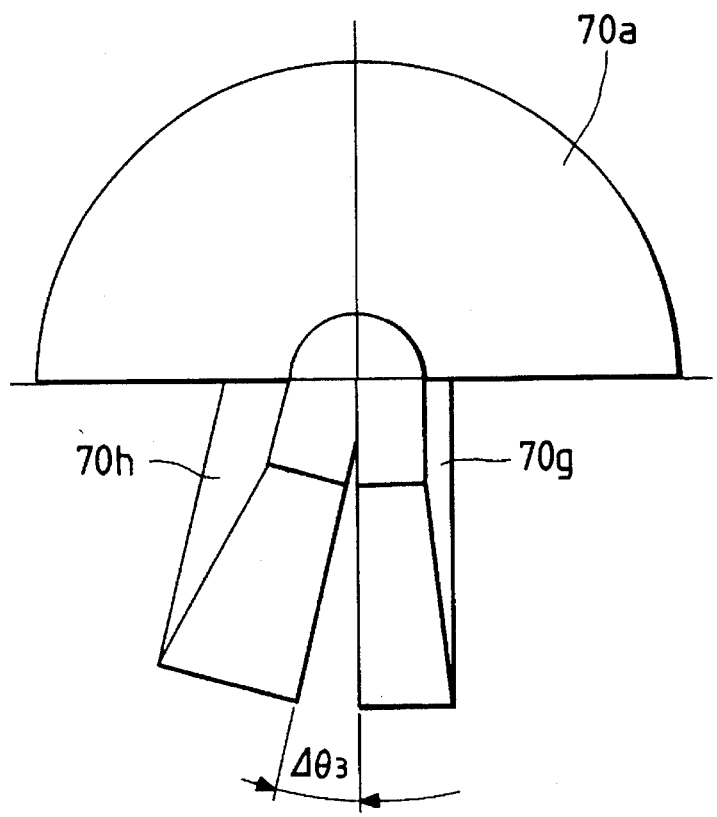
FIG. 15(B) is a rear elevational view of the modification of the lighting unit of FIG. 14(A)
Figure 16A:
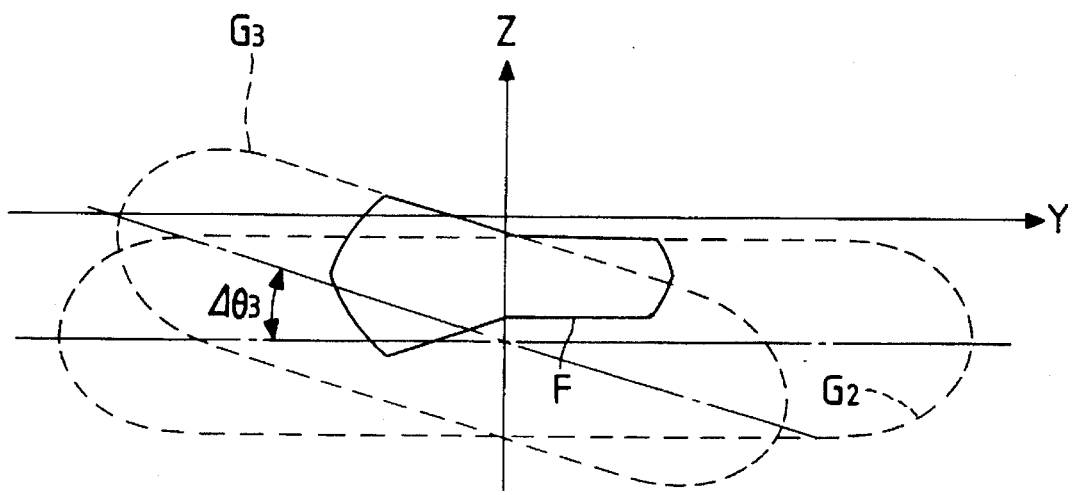
FIG. 16(A) is a diagram illustrating the (transverse) luminous intensity distribution curves of the light emitted from the emitting surface of the lighting unit of FIG. 15(A)
Figure 16B:
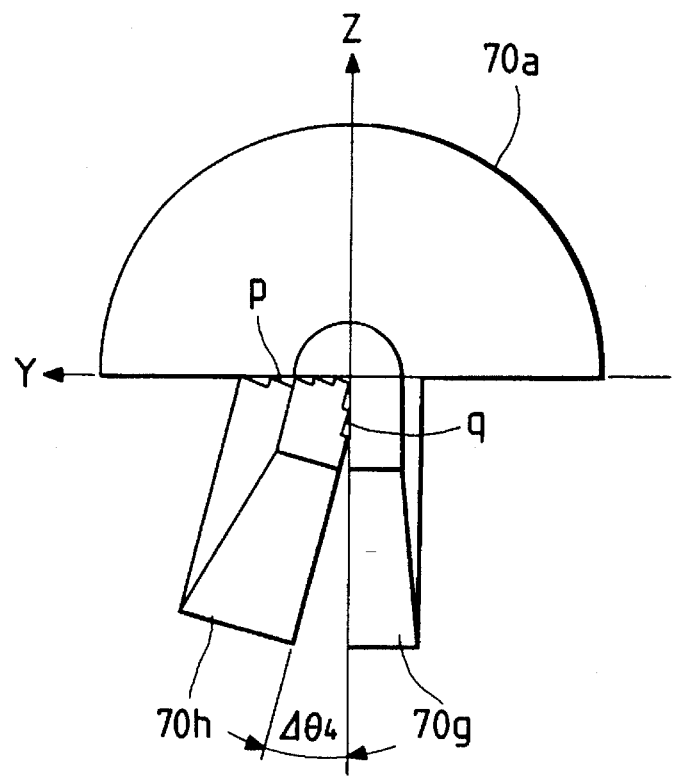
FIG. 16(B) is a rear elevational view of a modification of a light guiding member of the lighting unit of FIG. 15(A)

Incidentally, in case of the fourth embodiment of the present invention, the light guiding members 70g and 70h are united with each other. However, instead of this, the light guiding member 70h may be inclined to the light guiding member 70g at a predetermined angle $\Delta\theta_3$ around Y-axis as viewed in FIGS. 15(A) and 15(B). Thereby, the luminous intensity distribution curve G3 is inclined to the luminous intensity distribution curve G2 at the predetermined angle $\Delta\theta_3$ as shown in FIG. 16(A). In such a case, the top surface and the side surface of the light guiding member 70h, which face the lighting unit body 70a and the light guiding member 70g, respectively, are formed like steps indicated by reference characters p and q in illustrated in FIG. 16(B). Thus, the outer circumferential edge of the region of the rays of light, which is represented by the luminous intensity distribution curve G3, is not blurred but becomes plain.

Figure 17A:
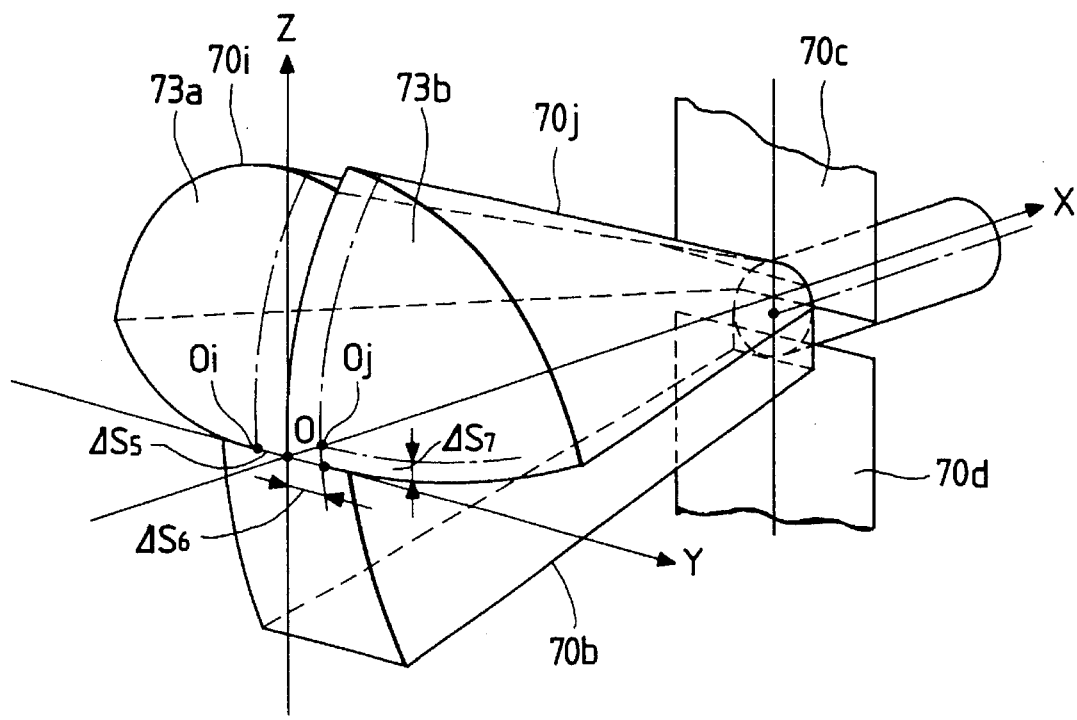
FIG. 17(A) is an enlarged perspective view of a primary portion of a left.-side head lamp (namely, a fifth embodiment) of the present invention.
Figure 17B:
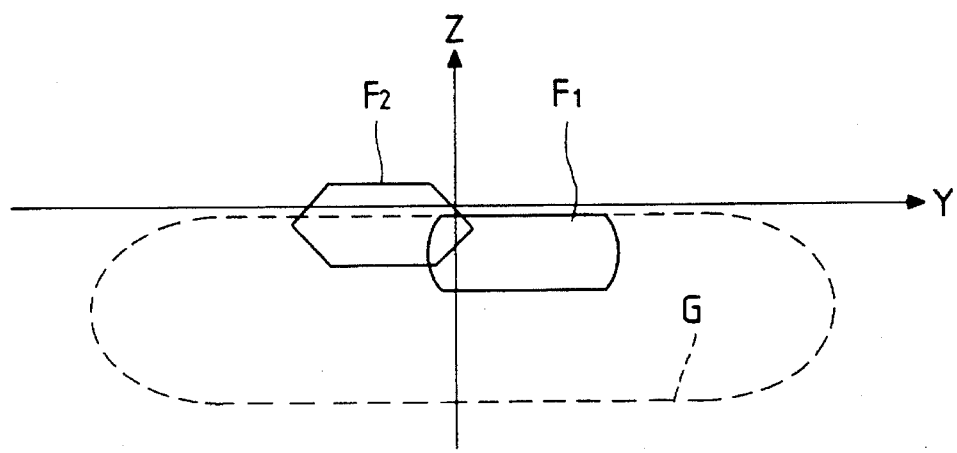
FIG. 17(B) is a diagram illustrating the (transverse) luminous intensity distribution curves of the light emitted from the emitting surface of the lighting unit of the left-side head lamp (namely, the fifth embodiment) of the present invention.

Next, the fifth embodiment of the present invention will be described hereinafter by referring to FIG. 17. The fifth embodiment of the present invention is characterized in that lighting unit bodies 70i and 70j (to be described later) are employed instead of the lighting unit body 70a (see FIG. 7) of the third embodiment of the present invention. The lighting unit bodies 70i and 70j are constructed as follows. Namely, the lighting unit body 70a is first divided into two portions. Incidentally, these portions (i.e., the lighting unit bodies 70i and 70j) are separated by XZ plane. Further, the pole $0i$ of the lens surface (namely, the light emitting surface $73a$) is established at a position, which is apart from the origin $0$ by a distance of $\Delta S_5$ along Y-axis, as illustrated in FIG. 17(A). On the other hand, the pole $0j$ of the lens surface (namely, the light emitting surface $73a$) is established at a position, which is apart from the origin O by a distance of $\Delta S_6$ along Y-axis and a distance of $\Delta S_7$ along Z-axis, as illustrated in FIG. 17(A). Thereby, instead of the luminous intensity distribution curve F of FIG. 9(B), the luminous intensity distribution curves F1 and F2 of FIG. 17(B) are obtained. Incidentally, the luminous intensity distribution curve F1 is obtained from light emitted from the light emitting surface $73a$ of the lighting unit body $70i$ in connection with the position of the pole $0i$ of the light emitting surface $73a$ of the lighting unit body $70i$. On the other hand, the luminous intensity distribution curve F2 is obtained from light emitted from the light emitting surface $73b$ of the lighting unit body $703$ in connection with the position of the pole $0j$ of the light emitting surface $73b$ of the lighting unit body $703$. The remainder of the configuration and effects of the fifth embodiment is the same as of the third embodiment.

While preferred embodiments of the present invention have been described above, it is to be understood that the present invention is not limited thereto and that other modifications will be apparent to those skilled in the art without departing from the spirit of the invention.

For instance, each of the first emitting surface portion $21a$ of the lighting unit body $20a$ and the first emitting surface portion of the lighting unit body $40a$ may be formed as a lens surface on which a plurality of steps are formed in the vertical direction.

Further, each of the composing elements $30$ and $50$ may consist of a bundle of optical fibers, instead of a single optical fiber.

Moreover, the number of the light guiding members of the lighting device $20$ may be changed. Thereby, the degree of freedom in luminous intensity distribution of the head lamp L can be increased. This is the same with the head lamp R.

Furthermore, the extent or range in the vertical direction along Z-axis, to which light emitted from the light emitting surface $24a$ of the light guiding member $20b$ can reach, can be freely regulated by changing the shape in the vertical direction along Z-axis of the light emitting surface $24a$. In such a case, similarly as the terraced light emitting surface of the light guiding member $20c$, the light emitting surface $24a$ may be partitioned or terraced to provide a plurality of luminous intensity distributions and make the plurality of luminous intensity distributions overlap with one another.

Additionally, the extent or range, to which illumination light can reach, may be changed by shifting the focal point of each of the second and third emitting surface portions $21b$ and $21c$ of the lighting unit body $20a$.

In addition, in the foregoing description of each of the third to fifth embodiments and the modifications thereof, only the left-side head lamp has been described. Apparently, the techniques of these embodiments and modifications can be applied to the right-side lamp.

Further, in the foregoing description, only the examples of the lighting device provided with the head lamps for use in a vehicle have been described. However, apparently, the present invention can be applied to a lighting device provided with a fog lamp for used in a vehicle. In such a case, it is sufficient for the device to utilize only the flat luminous intensity distribution of light emitted from the light guiding member $20$.

The scope of the present invention, therefore, is to be determined solely by the appended claims.

What is claimed is:

1. A lighting device for use in a vehicle, the lighting device having a lighting unit for receiving light from a light source and emitting the received light, the lighting unit comprising:

an optical fiber for receiving light from the light source and emitting the received light; and an optical waveguide, directly connected to the optical fiber, for directly receiving the light emitted from the optical fiber and emitting light which has a desired luminous intensity distribution, said waveguide including a lens constructed and arranged to converge light and having a length extending from an end of the optical fiber to a light emitting surface of the waveguide.

2. The lighting device for use in a vehicle according to claim 1, wherein the lighting unit is a head lamp for receiving light from the light source and emitting the received light forward of the vehicle, wherein the optical waveguide has a plurality of optical sub-waveguides each, directly connected to the optical fiber, for directly receiving the light emitted from the optical fiber and emitting light, wherein the optical sub-waveguides are combined with one another to provide a "hot zone" luminous intensity distribution and a flat luminous intensity distribution.

3. The lighting device for use in a vehicle according to claim 2, wherein the optical sub-waveguide for obtaining a flat luminous intensity distribution is disposed on the optical sub-waveguide for obtaining "hot zone" luminous intensity distribution.

4. The lighting device for use in a vehicle according to claim 2, wherein the optical sub-waveguide for obtaining a "hot zone" luminous intensity distribution comprises a lighting unit body shaped like a fan cone.

5. The lighting device for use in a vehicle according to claim 2, wherein the optical sub-waveguide for obtaining a "hot zone" luminous intensity distribution is disposed on the optical sub-waveguide for obtaining a flat luminous intensity distribution.

6. A lighting device for use in a vehicle, the lighting device having a lighting unit for receiving light from a light source and emitting the received light, the lighting unit comprising:

an optical fiber for receiving light from the light source and emitting the received light; and an optical waveguide, directly connected to the optical fiber, for directly receiving the light emitted from the optical fiber and emitting light which has a desired luminous intensity distribution, wherein the lighting unit is a head lamp for receiving light from the light source and emitting the received light forward of the vehicle, wherein the optical waveguide has a plurality of optical sub-waveguides, each directly connected to the optical fiber, for directly receiving the light emitted from the optical fiber and emitting light, wherein the optical sub-waveguides are combined with one another to provide a "hot zone" luminous intensity distribution and a flat luminous intensity distribution, wherein the optical sub-waveguides comprise:

first and second light sub-units for directly receiving light from the optical fiber and emitting the received light to provide "hot zone" luminous intensity distribution; and a third lighting sub-unit, inserted between the first and second lighting sub-units, for directly receiving light from the optical fiber and emitting the received light to provide a flat luminous intensity distribution.

7. The lighting device for use in a vehicle according to claim 6, wherein light emitting surfaces of the first and second lighting sub-units form lens surfaces.

8. A lighting device for use in a vehicle, the lighting device having a lighting unit for receiving light from a light source and emitting the received light, the lighting unit comprising:

an optical fiber for receiving light from the light source and emitting the received light; and an optical waveguide, directly connected to the optical fiber, for directly receiving the light emitted from the optical fiber and emitting light which has a desired luminous intensity distribution, wherein the lighting unit is a head lamp for receiving light from the light source and emitting the received light forward of the vehicle, wherein the optical waveguide has a plurality of optical sub-waveguides each, directly connected to the optical fiber, for directly receiving the light emitted from the optical fiber and emitting light, wherein the optical sub-waveguides are combined with one another to provide a "hot zone" luminous intensity distribution and a flat luminous intensity distribution, wherein the optical sub-waveguides comprise:

a first lighting sub-unit for directly receiving light from the optical fiber and emitting the received light to provide a "hot zone" luminous intensity distribution;

a second lighting sub-unit, provided under the first lighting sub-unit, for directly receiving light from the optical fiber and emitting the received light to provide a flat luminous intensity distribution; and a plate-like shade portion, provided at a side of a light emitting end surface of the optical fiber, for inhibiting incidence of a part of light, which is emitted from the light emitting end surface of the optical fiber, on the first and second lighting sub-units.

9. The lighting device for use in a vehicle according to claim 8, wherein a light emitting surface of the first lighting sub-unit forms a lens surface.

10. The lighting device for use in a vehicle according to claim 8, wherein a boundary surface between the first and second lighting sub-units is shifted upwardly from a horizontal plane including a central axis of the optical fiber in parallel with the horizontal plane by a predetermined distance.

11. The lighting device for use in a vehicle according to claim 8, wherein an optical axis of the second lighting sub-unit is shifted below a central axis of the optical fiber in parallel therewith by a predetermined distance.

12. The lighting device for use in a vehicle according to claim 8, wherein an optical axis of the second lighting sub-unit is inclined at a predetermined angle to a central axis of the optical fiber.

13. The lighting device for use in a vehicle according to claim 8, wherein the shade portion comprises:

a first shade portion for shutting out light emitted from an upper end portion of said light emitting end surface of the optical fiber; and a second shade portion for shutting out light emitted from a lower end portion of said light emitting end surface of the optical fiber, wherein a part of a bottom end of the first shade portion is cut away as being titled upwardly at a predetermined angle with respect to an axis traverse to an axis along the light fiber, disposed between the first shade portion and the second shade portion.

* * * * *